US011036044B2

(12) United States Patent
Sugawa

(10) Patent No.: US 11,036,044 B2
(45) Date of Patent: Jun. 15, 2021

(54) LENS SYSTEM, LENS APPARATUS, ADAPTER APPARATUS, AND IMAGE PICKUP APPARATUS

(71) Applicant: CANON KABUSHIKI KAISHA, Tokyo (JP)

(72) Inventor: Yoshihiko Sugawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 16/418,292

(22) Filed: May 21, 2019

(65) Prior Publication Data

US 2019/0361228 A1 Nov. 28, 2019

(30) Foreign Application Priority Data

May 28, 2018 (JP) .............................. JP2018-101245

(51) Int. Cl.
*G02B 7/02* (2021.01)
*G02B 27/00* (2006.01)
*G02B 9/64* (2006.01)

(52) U.S. Cl.
CPC ........... *G02B 27/0068* (2013.01); *G02B 9/64* (2013.01)

(58) Field of Classification Search
CPC .............................. G02B 27/0068; G02B 9/64
See application file for complete search history.

(56) References Cited

U.S. PATENT DOCUMENTS

2017/0090151 A1\* 3/2017 Naruse ..................... G02B 9/64

FOREIGN PATENT DOCUMENTS

| JP | H09-189858 A | 7/1997 | |
| JP | H10-227977 A | 8/1998 | |
| JP | 2002-318346 A | 10/2002 | |
| JP | 2019207267 A | \* 12/2019 | ............. G02B 13/02 |
| WO | WO-2014196022 A1 | \* 12/2014 | ............ G02B 15/173 |

\* cited by examiner

*Primary Examiner* — William R Alexander
*Assistant Examiner* — Tamara Y. Washington
(74) *Attorney, Agent, or Firm* — Canon U.S.A., Inc. IP Division

(57) ABSTRACT

A lens system is disposed on the image side of an image pickup optical system and has a negative refractive power. The lens system includes, in order from an object side to the image side, a first lens unit having a positive refractive power, a second lens unit, and a third lens unit. The first lens unit consists of a single lens or a cemented lens. The second lens unit is configured to move in a direction of an optical axis to change a spherical aberration. A lateral magnification of the lens system and a lateral magnification of the second lens unit in a case where an axial ray is incident on the image pickup optical system are appropriately set.

20 Claims, 22 Drawing Sheets

LENS SYSTEM, LENS APPARATUS, ADAPTER APPARATUS, AND IMAGE PICKUP APPARATUS

BACKGROUND OF THE INVENTION

Field of the Invention

The aspect of the embodiments relates to a lens system, a lens apparatus, an adapter apparatus, and an image pickup apparatus.

Description of the Related Art

There has been known a lens apparatus provided with so-called a soft focus effect. This lens apparatus is different from a lens apparatus for ordinary imaging which is capable of obtaining sharp delineation in that its performances at a central part of an object image is modified in order to change delineation properties, bokeh textures, and the like of the image.

Japanese Patent Application Laid-Open No. 2002-318346 discloses a fixed focal length lens apparatus having a soft focus effect. To achieve the soft focus effect, the lens apparatus includes a master lens unit having a positive power and a soft focus effect lens unit having a negative power. The soft focus effect lens unit is configured to independently move at least a positive sub-unit and a negative sub-unit in a direction of an optical axis relative to the master lens unit.

Japanese Patent Application Laid-Open No. H09-189858 discloses a structure concerning an attachment lens apparatus to be attached to the image side of either a zoom lens apparatus or a fixed focal length lens apparatus. The attachment lens apparatus includes multiple lens units. In order to modify a spherical aberration, the attachment lens apparatus is configured to move at least one of the multiple lens units in a direction of an optical axis.

Japanese Patent Application Laid-Open No. H10-227977 discloses a microscope objective lens apparatus for biological observation, which has a configuration to correct deterioration in imaging performance caused by a change in thickness of cover glass and the like. The objective lens apparatus is configured to correct a spherical aberration by moving, in a direction of an optical axis, a lens unit including a cemented lens which is formed by cementing a positive lens and a negative lens.

The lens apparatus according to Japanese Patent Application Laid-Open No. 2002-318346 independently moves the multiple units in order to obtain the soft focus effect, and therefore leads to an increase in size or complexity of its structure.

In the case of the attachment lens apparatus according to Japanese Patent Application Laid-Open No. H09-189858, attachment of the attachment lens apparatus to another lens apparatus leads to a variation of a combined focal length of these lens apparatus from a combined focal length of the other lens apparatus alone.

The microscope objective lens apparatus according to Japanese Patent Application Laid-Open No. H10-227977 includes the lens unit for correcting a spherical aberration, and therefore leads to an increase in size or complexity of its structure.

SUMMARY OF THE INVENTION

A lens system of the disclosure is a lens system which is disposed on the image side of an image pickup optical system and has a negative refractive power. The lens system includes, in order from an object side to the image side, a first lens unit having a positive refractive power, a second lens unit, and a third lens unit. The first lens unit consists of a single lens or a cemented lens. The second lens unit is configured to move in a direction of an optical axis to change a spherical aberration. Conditional expressions $0.90 < B < 1.10$, and $0.95 < B2 < 1.05$, are satisfied where B is a lateral magnification of the lens system in a case where an axial ray is incident on the image pickup optical system and B2 is a lateral magnification of the second lens unit in a case where an axial ray is incident on the image pickup optical system.

Further features of the disclosure will become apparent from the following description of exemplary embodiments with reference to the attached drawings.

DESCRIPTION OF THE EMBODIMENTS

Figure 1:
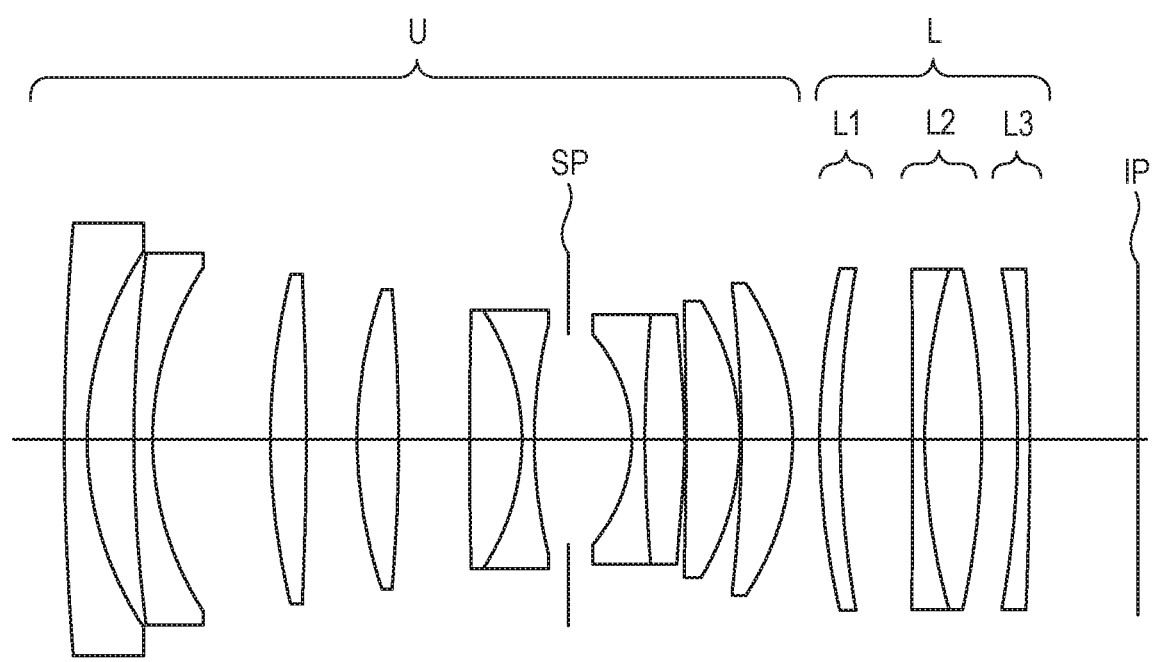
FIG. 1 is a cross-sectional view of a numerical embodiment 1 at the time of focusing on an infinite-distance object.

Next, features of embodiments of the disclosure will be described. An embodiment of the disclosure will be described below in detail with reference to the drawings. In the drawings, the same constituents are denoted by the same reference signs and overlapping explanations thereof will be omitted.

A spherical aberration-variable optical system (a lens system) of the aspect of the embodiments is used by being disposed on the image side of an image pickup optical system (an image pickup lens), in order to provide an image formed by these optical systems with sharpness and bokeh being different from those obtained solely from the image pickup system. The spherical aberration-variable optical system has a negative refractive power as a whole. Thus, it is possible to achieve reduction in size by bringing a principal point position of a combination of the image pickup optical system and the spherical aberration-variable optical system closer to the object. The spherical aberration-variable optical system of the aspect of the embodiments includes a first lens unit having a positive refractive power, a second lens unit, and a third lens unit, which are arranged in order from the object side to the image side. Regarding the spherical aberration variation, an interval between the first lens unit and the second lens unit and an interval between the second lens unit and the third lens unit vary as a consequence of making only the second lens unit movable independently in a direction of an optical axis. Here, the refractive power is defined as the reciprocal of a focal length.

The spherical aberration-variable optical system of the aspect of the embodiments satisfies the following conditional expression (1):

$$0.90 < B < 1.10 \qquad (1),$$

where B is a lateral magnification of the spherical aberration-variable optical system in a case in a case where an axial ray is incident on an image pickup optical lens. This conditional expression is defined in order to cause a focal length of the image pickup optical system and a combined focal length of the image pickup optical system and the spherical aberration-variable optical system to substantially coincide with each other when the spherical aberration-variable optical system of the aspect of the embodiments is used by being disposed on the image side of the image pickup optical system.

If the condition of the upper limit in the conditional expression (1) or the condition of the lower limit therein is not satisfied, the focal length of the image pickup optical system significantly varies from the combined focal length of the image pickup optical system and the spherical aberration-variable optical system. In one embodiment, the conditional expression (1) is set as follows:

$$0.95 < B < 1.05 \qquad (1a).$$

Meanwhile, the spherical aberration-variable optical system of the aspect of the embodiments satisfies the following conditional expression (2):

$$0.95 < B2 < 1.05 \qquad (2),$$

where B2 is a lateral magnification of the second lens unit of the spherical aberration-variable optical system in a case where the axial ray is incident on the image pickup optical lens. This conditional expression is defined in order not to cause a change between back focus before a movement and back focus after the movement when the second lens unit of the spherical aberration-variable optical system of the aspect of the embodiments independently moves in the direction of the optical axis. Here, if sk represents an amount of change in back focus per unit amount of movement in the direction of the optical axis of the second lens unit, then sk is approximately defined by the following expression:

$$sk \approx 1-B2^2 \qquad (3).$$

If the condition of the upper limit in the conditional expression (2) or the condition of the lower limit therein is not satisfied, the back focus defined by the image pickup optical system and the spherical aberration-variable optical system before the movement significantly varies from the back focus defined by the image pickup optical system and the spherical aberration-variable optical system after the movement. In one embodiment, the conditional expression (2) set as follows:

$$0.98 < B2 < 1.02 \qquad (2a).$$

A small and simple lens structure provided with the spherical aberration-variable optical system is obtained by specifying a lens configuration as described above. Forms of the second lens unit and the third lens unit are defined as additional aspects of the spherical aberration-variable optical system of the disclosure. Since the spherical aberration-variable optical system has the negative refractive power, a positive spherical aberration is likely to be developed in a state of disposing the spherical aberration-variable optical system on the image side of the image pickup optical system. However, it is possible to effectively control a negative spherical aberration as well by forming each of a surface of the second lens unit located closest to the image and a surface of the third lens unit located closest to the object each into a concave shape relative to the object. In other words, each of a curvature radius of the surface of the second lens unit located closest to the image and a curvature radius of the surface of the third lens unit located closest to the object has a negative curvature radius. In the meantime, a height of an axial ray can be changed by adjusting the interval between the second lens unit and the third lens unit. Specifically, a negative spherical aberration is developed by an increase in interval between the second lens unit and the third lens unit while a positive spherical aberration is developed by a decrease in interval between the second lens unit and the third lens unit.

An average refractive index of negative lenses included in the spherical aberration-variable optical system is defined as an additional aspect of the spherical aberration-variable optical system of the aspect of the embodiments. In one embodiment, the following conditional expression (4) is satisfied:

$$1.65 < ndave \qquad (4),$$

where ndave is an average refractive index with respect to the d-line of the materials of the negative lenses included in the spherical aberration-variable optical system.

A curvature of field can be favorably corrected when the conditional expression (4) is satisfied. This is effective for correcting a Petzval sum by using a material having a high refractive index for the negative lenses because the negative refractive power is increased in order to reduce the size of the spherical aberration-variable optical system. In another embodiment, the conditional expression (4) is set as follows:

$$1.70 < ndave < 2.00 \qquad (4a).$$

An Abbe number of the lens in the spherical aberration-variable optical system located closest to the object is defined as an additional aspect of the spherical aberration-variable optical system of the aspect of the embodiments. In one embodiment, the following conditional expression (5) is satisfied:

$$15 < vd1 < 40 \qquad (5),$$

where vd1 is the Abbe number with respect to the d-line of the material of the lens in the spherical aberration-variable optical system located closest to the object.

Axial and lateral chromatic aberrations that are likely to be developed in the spherical aberration-variable optical system can be favorably corrected when the conditional expression (5) is satisfied. This is because the refractive power of the lens in the spherical aberration-variable optical system located closest to the object has a small refractive power while the lens in the spherical aberration-variable optical system located second closest to the object also has a negative refractive power. Accordingly, it is possible to effectively correct the chromatic aberrations to be developed by the refractive power. In one embodiment, the conditional expression (5) is set as follows:

$$17 < vd1 < 35 \qquad (5a).$$

The refractive power of each of the first lens unit and the third lens unit in the spherical aberration-variable optical system is defined as an additional aspect of the spherical aberration-variable optical system of the aspect of the embodiments. In one embodiment, the following conditional expression (6) is satisfied:

$$-5.0 < f1/f3 < -1.0 \qquad (6),$$

where f1 is a focal length of the first lens unit and f3 is a focal length of the third lens unit.

The spherical aberration-variable optical system can suppress changes of various aberrations other than the spherical aberrations when the conditional expression (6) is satisfied. If the condition of the upper limit in the conditional expression (6) is not satisfied, it is difficult to reduce the size of the spherical aberration-variable optical system that has the negative refractive power as a whole. Meanwhile, if the condition of the lower limit in the conditional expression 6 is not satisfied, it is difficult to suppress off-axial aberrations to be developed by the movement of the second lens unit. In another embodiment, the conditional expression (6) is set as follows:

$$-4.0 < f1/f3 < -1.5 \qquad (6a).$$

The number of lenses in the spherical aberration-variable optical system is defined as an additional aspect of the spherical aberration-variable optical system of the aspect of the embodiments. This makes it possible to achieve a small and simple structure of the spherical aberration-variable optical system. In this instance, one or more of the following features are satisfied. A first feature is that the first lens unit has the positive refractive power formed from either a single lens or a cemented lens. This feature is effective for securing a sufficient amount of movement of the second lens unit in the direction of the optical axis in order to render the spherical aberration variable. A second feature is that the spherical aberration-variable optical system is formed from four lenses. This feature is effective for achieving a small and simple structure of the spherical aberration-variable optical system. A third feature is that the second lens unit of the spherical aberration-variable optical system is formed from two lenses. Here, in the case of a cemented lens in which a negative lens is joined to a positive lens, the cemented lens is characterized by being formed from the two lenses. This feature is effective for achieving a small structure of the second lens unit to render the spherical aberration variable.

Now, first to ninth embodiments will be described below with reference to the accompanying drawings.

First Embodiment

A spherical aberration-variable optical system according to a first embodiment of the disclosure will be described with reference to FIGS. 1 to 2C.

FIG. 1 is a cross-sectional view of lenses when spherical aberration-variable optical lenses of the first embodiment of the disclosure focus on an infinite-distance object. Here, a description will be given of the lenses which are configured such that the spherical aberration-variable optical system of the disclosure is attachable to and detachable from the image side of an image pickup optical system. However, the aspect of the embodiments is not limited only to this configuration. The same effect can be obtained in a configuration in which the spherical aberration-variable optical system of the aspect of the embodiments is integrally formed on the image side of the image pickup optical system. The same applies to second to ninth embodiments to be described later. Next, lens configurations of respective lens units will be described. The configurations of the respective lens units are arranged in order from the object side to the image side unless otherwise specified. The same applies to the second to ninth embodiments to be described later.

Reference sign U denotes an image pickup optical system having a positive refractive power as a whole. Reference sign SP denotes an aperture stop. A spherical aberration-variable optical system L disposed on the image side of the image pickup optical system and having a negative refractive power as a whole is formed from three lens units.

A description will be given of the lens configurations of the respective lens units in the spherical aberration-variable optical system L. A first lens unit L1 having a positive refractive power is formed from a positive lens that has a meniscus shape with a convex surface on the object side. A second lens unit L2 having a positive refractive power is formed from a cemented lens obtained by joining a negative lens to a positive lens. A third lens unit L3 having a negative refractive power is formed from a negative lens that has a meniscus shape with a concave surface on the object side. The second lens unit L2 is a lens unit that moves independently in the direction of the optical axis and modifies a state of a spherical aberration. Reference sign IP denotes an image plane. When the optical system of this embodiment is used as an optical system of a video camera or a digital camera, the image plane IP corresponds to an image pickup plane of an image pickup element (a photoelectric conversion element) such as a CCD sensor and a CMOS sensor to receive an image formed by this optical system. Meanwhile, when the optical system is used as an optical system of a silver halide film camera, the image plane IP corresponds to a film surface.

The image pickup optical system U acts as an ordinary imaging lens system that enables sharp delineation by itself. Meanwhile, by disposing the spherical aberration-variable optical system L on the image side of the image pickup optical system U, these systems form spherical aberration-variable optical lenses that can obtain delineation that develops a spherical aberration equivalent to that only with the image pickup optical system U, delineation that develops a large negative spherical aberration, and delineation that develops a large positive spherical aberration. A surface of the second lens unit L2 in the spherical aberration-variable optical system L located closest to the image is formed into a convex shape relative to the image side while a surface of the third lens unit L3 of the spherical aberration-variable optical system L located closest to the object is formed into a concave shape relative to the object side. The lens surface of the second lens unit L2 located closest to the image is a converging surface and therefore develops the negative spherical aberration. On the other hand, the lens surface of the third lens unit L3 located closest to the object is a diverging surface and therefore develops the positive spherical aberration. Accordingly, the height of the axial ray can be changed by independently moving the second lens unit L2 in the direction of the optical axis. When the second lens unit L2 moves toward the object, the axial ray passed through the lens surface of the lens of the second lens unit L2 located closest to the image is increased in height. Hence, the negative spherical aberration is developed as a consequence. When the negative spherical aberration is developed, it is possible to achieve soft delineation involving back bokeh that represents a state of bokeh of objects located at the back of a focused object. On the other hand, when the second lens unit L2 moves toward the image, the axial ray passed through the lens surface of the lens of the second lens unit L2 located closest to the object is reduced in height. Hence, the positive spherical aberration is developed as a consequence. When the positive spherical aberration is developed, it is possible to achieve soft delineation involving front bokeh that represents a state of bokeh of objects located in front of the focused object.

The configuration of the image pickup optical system U is entirely the same in the first to fourth and sixth to ninth embodiments. The image pickup optical system U of the first embodiment has a focal length of 34.20 mm, a half angle of view of 32.32 degrees, and an F-number of 1.45. These values are all the same in the first to fourth and sixth to ninth embodiments. When the negative spherical aberration is developed by the movement in the direction of the optical axis of the second lens unit L2 in the spherical aberration-variable optical system L of the first embodiment, the spherical aberration-variable optical lenses have the focal length of 34.07 mm, the half angle of view of 32.42 degrees, and the F-number of 1.44. When no spherical aberration is developed by the movement in the direction of the optical axis of the second lens unit L2 in the spherical aberration-variable optical system L of the first embodiment, the spherical aberration-variable optical lenses have the focal length of 34.19 mm, the half angle of view of 32.33 degrees, and the F-number of 1.45. When the positive spherical aberration is developed by the movement in the direction of the optical axis of the second lens unit L2 in the spherical aberration-variable optical system L of the first embodiment, the spherical aberration-variable optical lenses have the focal length of 34.30 mm, the half angle of view of 32.25 degrees, and the F-number of 1.45.

Figure 2A:
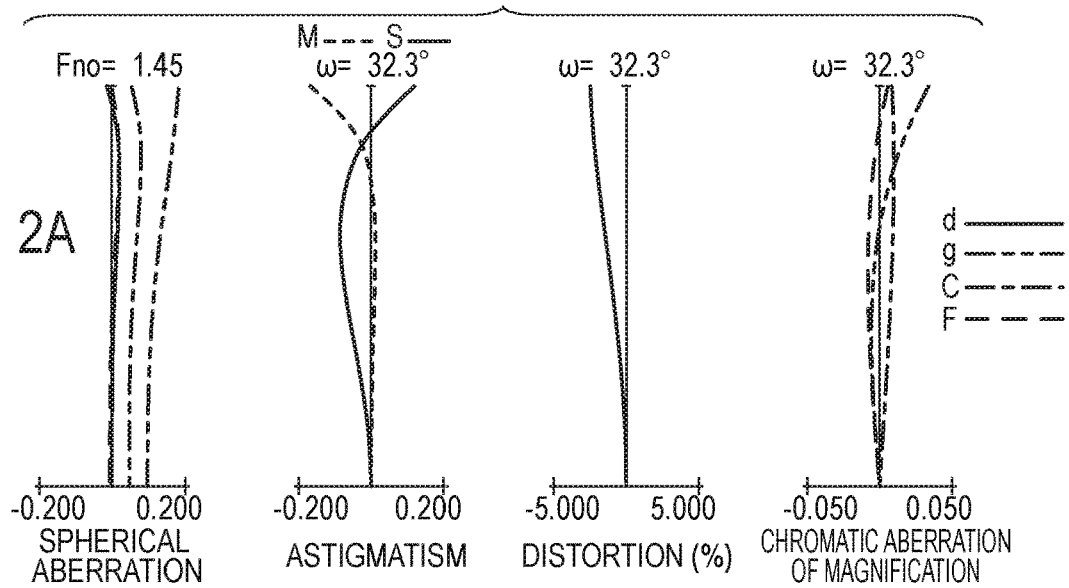
FIG. 2A illustrates longitudinal aberration diagrams of the numerical embodiment 1 at the time of focusing on the infinite-distance object.
Figure 2B:
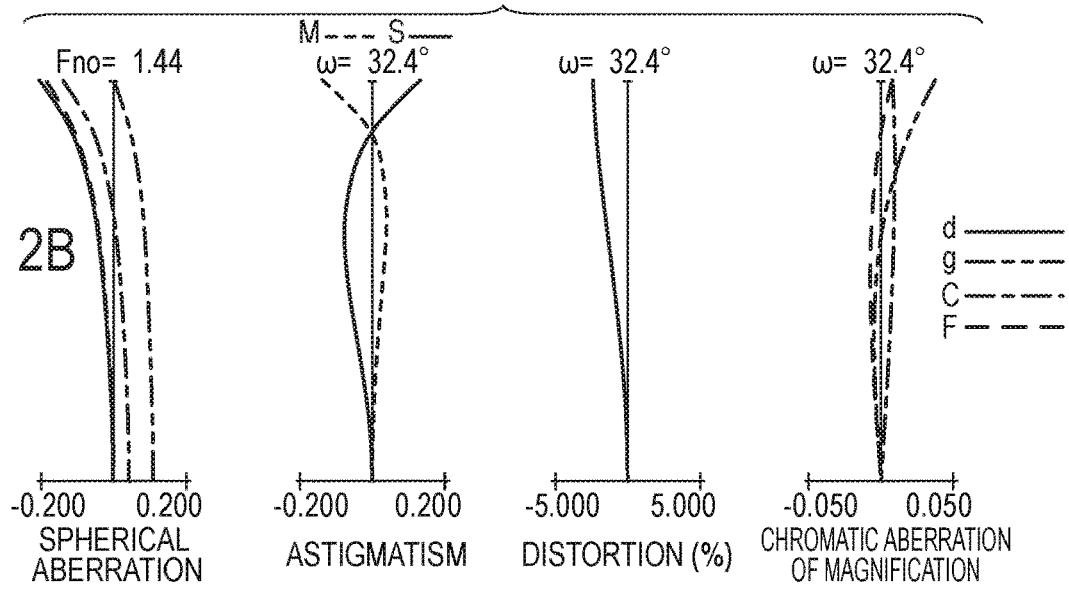
FIG. 2B illustrates more longitudinal aberration diagrams of the numerical embodiment 1 at the time of focusing on the infinite-distance object.
Figure 2C:
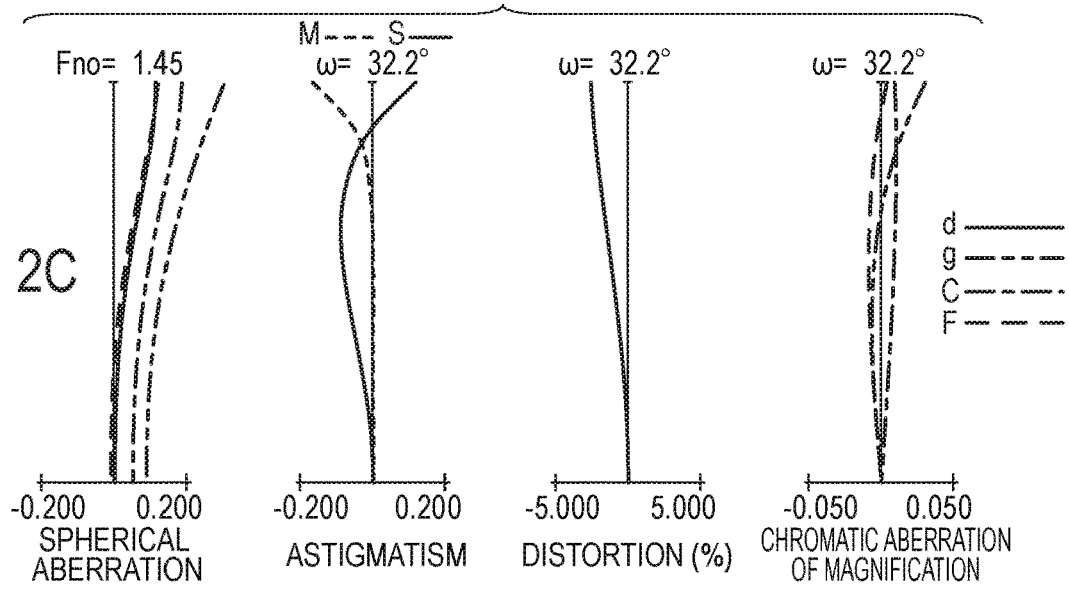
FIG. 2C illustrates more longitudinal aberration diagrams of the numerical embodiment 1 at the time of focusing on the infinite-distance object.
Figure 19:
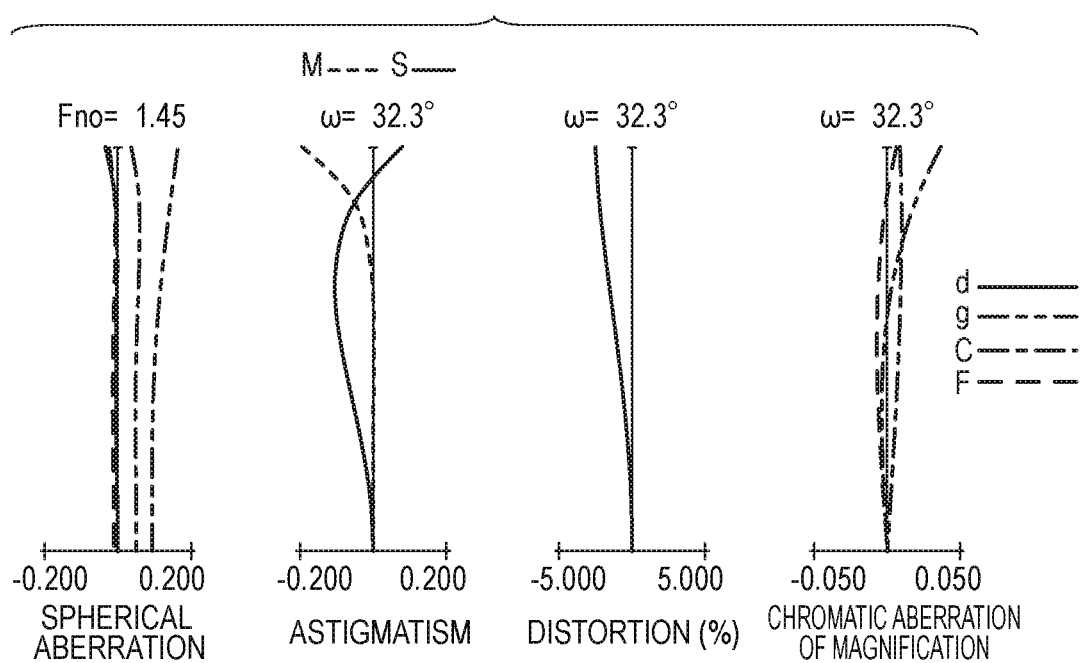
FIG. 19 illustrates longitudinal aberration diagrams of lenses each consisting of an image pickup optical lens in the first to fourth and sixth to ninth numerical embodiments at the time of focusing on the infinite-distance object.

FIG. 2A illustrates longitudinal aberration diagrams at the time of focusing on the infinite-distance object when no spherical aberration is developed by the movement in the direction of the optical axis of the second lens unit L2 of the spherical aberration-variable optical system L. FIG. 2B illustrates longitudinal aberration diagrams at the time of focusing on the infinite-distance object when the negative spherical aberration is developed by the movement in the direction of the optical axis of the second lens unit L2 in the spherical aberration-variable optical system L. FIG. 2C illustrates longitudinal aberration diagrams at the time of focusing on the infinite-distance object when the positive spherical aberration is developed by the movement in the direction of the optical axis of the second lens unit L2 in the spherical aberration-variable optical system L. Note that longitudinal aberration diagrams of a lens apparatus consisting of the image pickup optical system of the first embodiment, which are illustrated in FIG. 19, are the same in the first to fourth and sixth to ninth embodiments. Each set of the longitudinal aberration diagrams illustrate spherical aberration, astigmatism, distortion, and chromatic aberration of magnification (lateral chromatic aberration) from left to right. In the diagrams illustrating the spherical aberration and the chromatic aberration of magnification, a solid line d represents the d-line (587.6 nm) and a dashed line g represents the g-line (435.8 nm). Meanwhile, in the diagrams illustrating the astigmatism, a solid line ΔS represents a sagittal image plane of the d-line and a dashed line ΔM represents a meridional image plane of the d-line. In the meantime, the diagrams illustrating the distortion represent the distortion in the d-line. A chain double-dashed line in the chromatic aberration of magnitude represents the g-line. Reference sign ω denotes the half angle of view and reference sign Fno denotes the F-number. The longitudinal aberration diagrams are depicted at scales of 0.2 mm for the spherical aberration, 0.2 mm for the astigmatism, 5% for the distortion, and 0.05 mm for the chromatic aberration of magnitude, respectively. As shown in Table 1, regarding the values in this embodiment corresponding to the respective conditional expressions, this embodiment satisfies the conditional expressions (1), (2), and (4) to (6). Thus, the spherical aberration-variable optical system having a small and simple structure is obtained.

Second Embodiment

Figure 3:
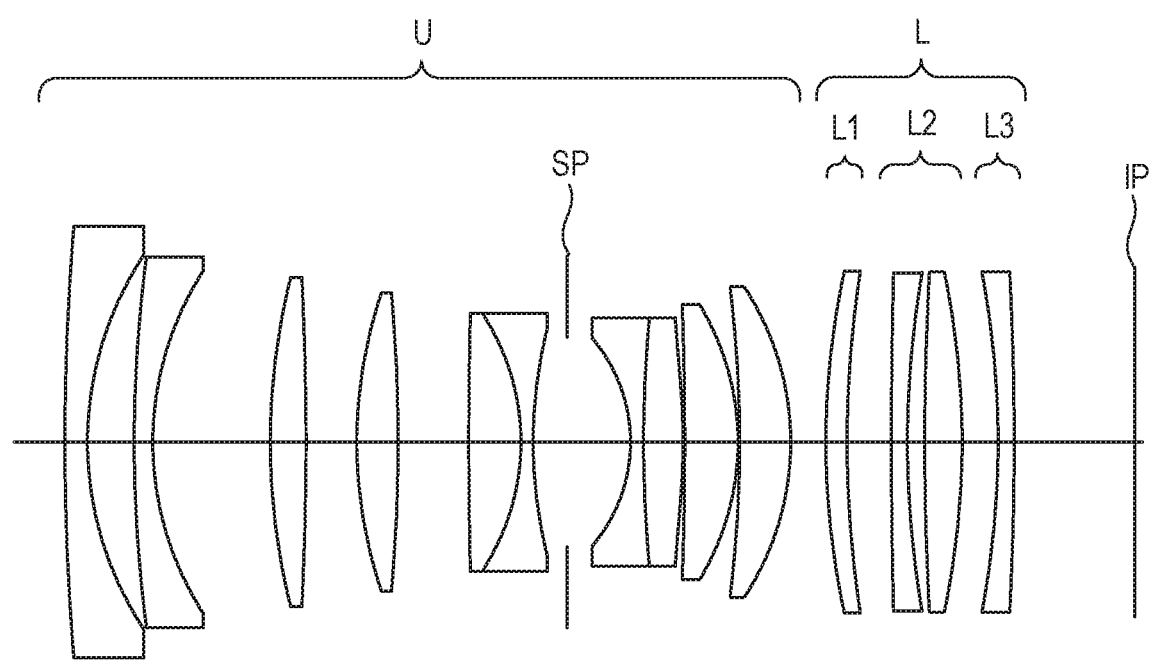
FIG. 3 is a cross-sectional view of a numerical embodiment 2 at the time of focusing on an infinite-distance object.

FIG. 3 is a cross-sectional view of lenses when spherical aberration-variable optical lenses of a second embodiment of the disclosure focus on an infinite-distance object. In the second embodiment, the configuration of the image pickup optical system U is entirely the same as that of the first embodiment. A description will be given of the lens configurations of the respective lens units in the spherical aberration-variable optical system L according to the second embodiment. The first lens unit L1 having the positive refractive power is formed from the positive lens that has the meniscus shape with the convex surface on the object side. The second lens unit L2 having the positive refractive power is formed from a negative lens that has a meniscus shape with a convex surface on the object side, and from a positive lens. The third lens unit L3 having the negative refractive power is formed from the negative lens that has the meniscus shape with the concave surface on the object side. The second lens unit L2 is the lens unit that moves independently in the direction of the optical axis and modifies the state of the spherical aberration.

When the negative spherical aberration is developed by the movement in the direction of the optical axis of the second lens unit L2 in the spherical aberration-variable optical system L of the second embodiment, the spherical aberration-variable optical lenses have the focal length of 34.10 mm, the half angle of view of 32.40 degrees, and the F-number of 1.45. When no spherical aberration is developed by the movement in the direction of the optical axis of the second lens unit L2 in the spherical aberration-variable optical system L of the second embodiment, the spherical aberration-variable optical lenses have the focal length of 34.19 mm, the half angle of view of 32.33 degrees, and the F-number of 1.45. When the positive spherical aberration is developed by the movement in the direction of the optical axis of the second lens unit L2 in the spherical aberration-variable optical system L of the second embodiment, the spherical aberration-variable optical lenses have the focal length of 34.28 mm, the half angle of view of 32.26 degrees, and the F-number of 1.45.

Figure 4A:
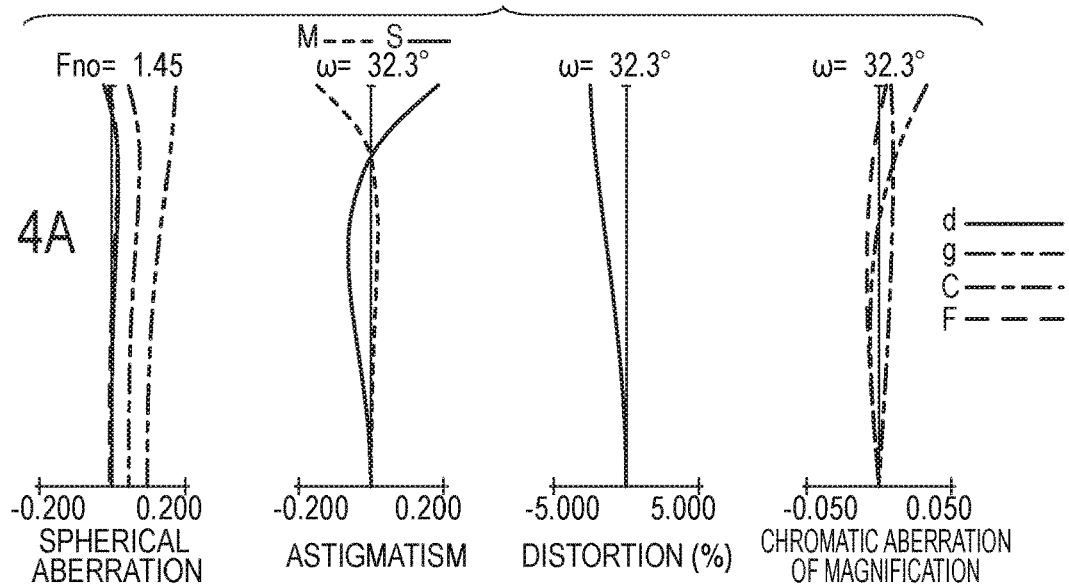
FIG. 4A illustrates longitudinal aberration diagrams of the numerical embodiment 2 at the time of focusing on the infinite-distance object.
Figure 4B:
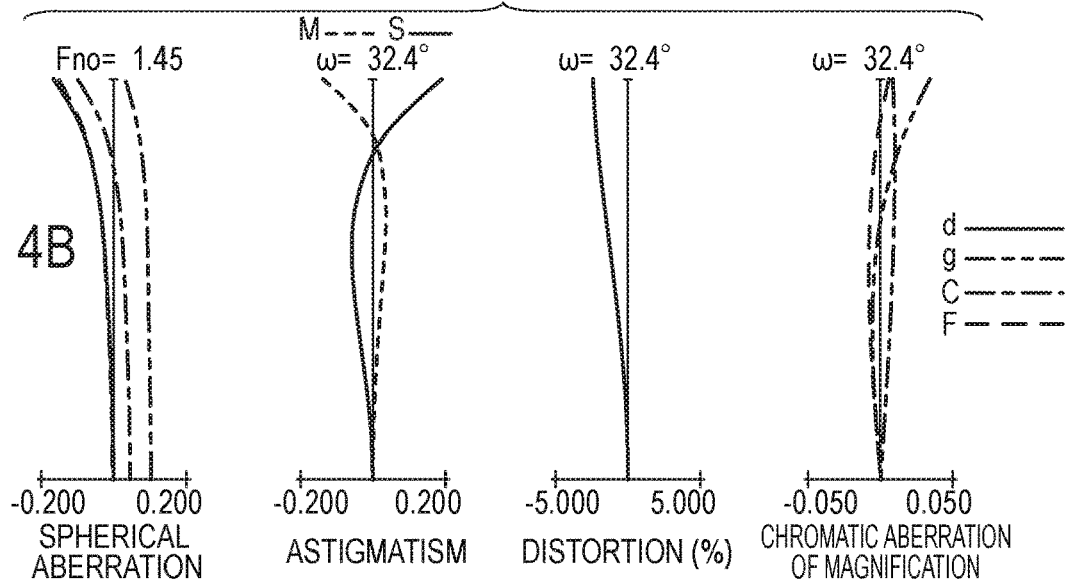
FIG. 4B illustrates more longitudinal aberration diagrams of the numerical embodiment 2 at the time of focusing on the infinite-distance object.
Figure 4C:
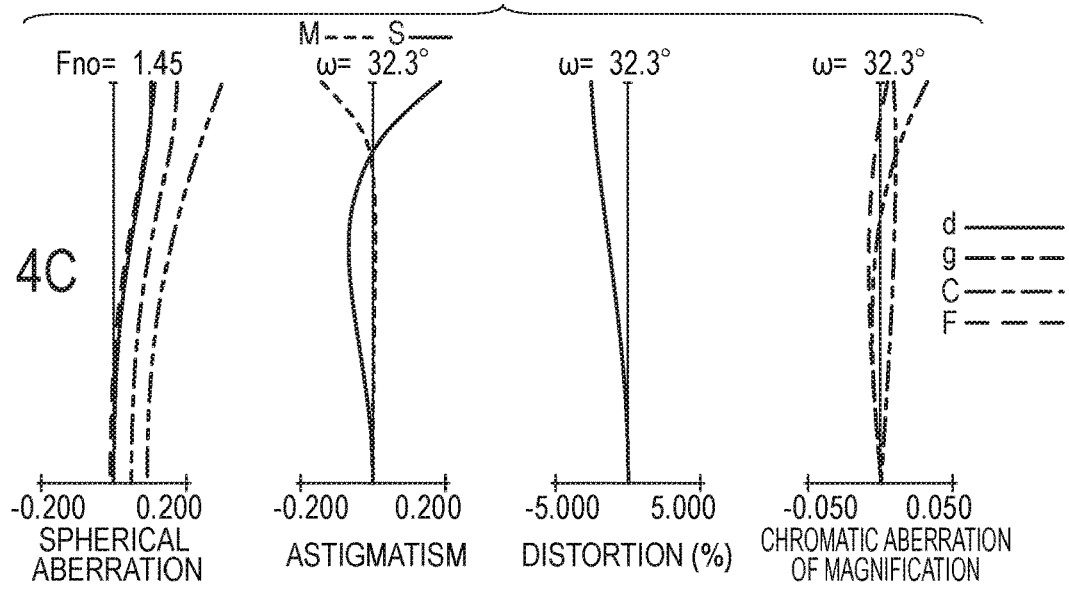
FIG. 4C illustrates more longitudinal aberration diagrams of the numerical embodiment 2 at the time of focusing on the infinite-distance object.

FIG. 4A illustrates longitudinal aberration diagrams at the time of focusing on the infinite-distance object when no spherical aberration is developed by the movement in the direction of the optical axis of the second lens unit L2 of the spherical aberration-variable optical system L. FIG. 4B illustrates longitudinal aberration diagrams at the time of focusing on the infinite-distance object when the negative spherical aberration is developed by the movement in the direction of the optical axis of the second lens unit L2 in the spherical aberration-variable optical system L. FIG. 4C illustrates longitudinal aberration diagrams at the time of focusing on the infinite-distance object when the positive spherical aberration is developed by the movement in the direction of the optical axis of the second lens unit L2 in the spherical aberration-variable optical system L. Note that the longitudinal aberration diagrams of the lens apparatus consisting of the image pickup optical system U of the second embodiment, which are illustrated in FIG. 19, are the same in the first to fourth and sixth to ninth embodiments. As shown in Table 1, regarding the values in this embodiment corresponding to the respective conditional expressions, this embodiment satisfies the conditional expressions (1), (2), and (4) to (6). Thus, the spherical aberration-variable optical system having a small and simple structure is obtained.

Third Embodiment

Figure 5:
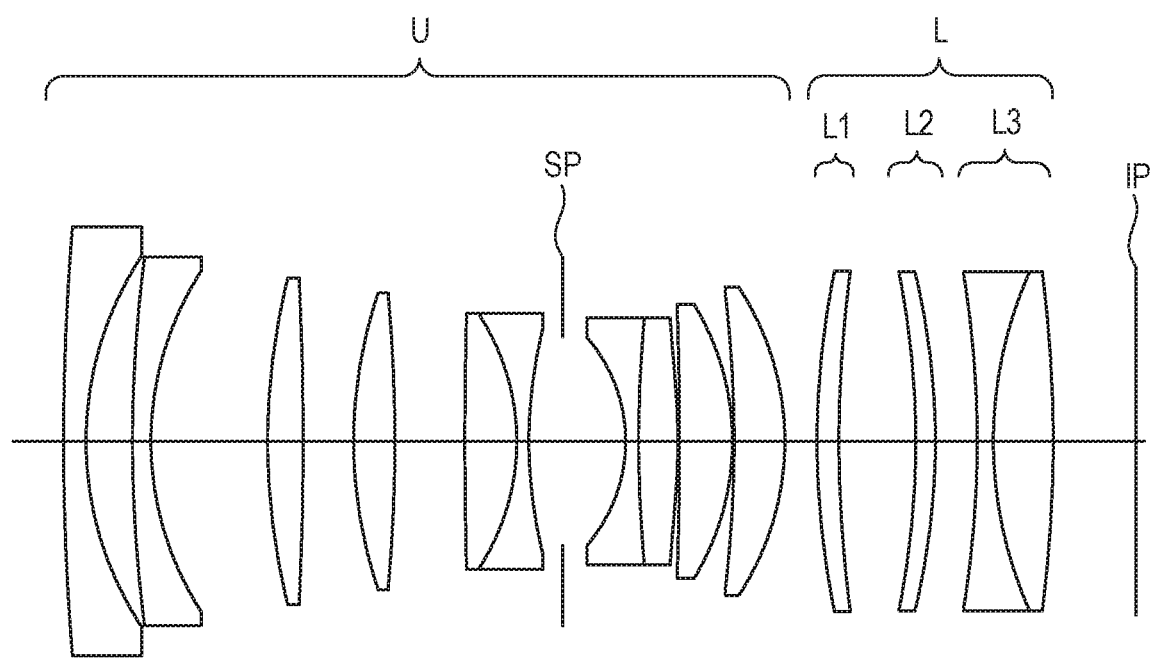
FIG. 5 is a cross-sectional view of a numerical embodiment 3 at the time of focusing on an infinite-distance object.

FIG. 5 is a cross-sectional view of lenses when spherical aberration-variable optical lenses of a third embodiment of the disclosure focus on an infinite-distance object. In the third embodiment, the configuration of the image pickup optical system U is entirely the same as that of the first embodiment. A description will be given of the lens configurations of the respective lens units in the spherical aberration-variable optical system L according to the third embodiment. The first lens unit L1 having the positive refractive power is formed from the positive lens that has the meniscus shape with the convex surface on the object side. The second lens unit L2 having the positive refractive power is formed from a negative lens that has a meniscus shape with a concave surface on the object side. The third lens unit L3 having the negative refractive power is formed from a cemented lens obtained by joining a negative lens to a positive lens. The second lens unit L2 is the lens unit that moves independently in the direction of the optical axis and modifies the state of the spherical aberration.

When the negative spherical aberration is developed by the movement in the direction of the optical axis of the second lens unit L2 in the spherical aberration-variable optical system L of the third embodiment, the spherical aberration-variable optical lenses have the focal length of 33.99 mm, the half angle of view of 32.47 degrees, and the F-number of 1.44. When no spherical aberration is developed by the movement in the direction of the optical axis of the second lens unit L2 in the spherical aberration-variable optical system L of the third embodiment, the spherical aberration-variable optical lenses have the focal length of 34.19 mm, the half angle of view of 32.32 degrees, and the F-number of 1.45. When the positive spherical aberration is developed by the movement in the direction of the optical axis of the second lens unit L2 in the spherical aberration-variable optical system L of the third embodiment, the spherical aberration-variable optical lenses have the focal length of 34.46 mm, the half angle of view of 32.12 degrees, and the F-number of 1.46.

Figure 6A:
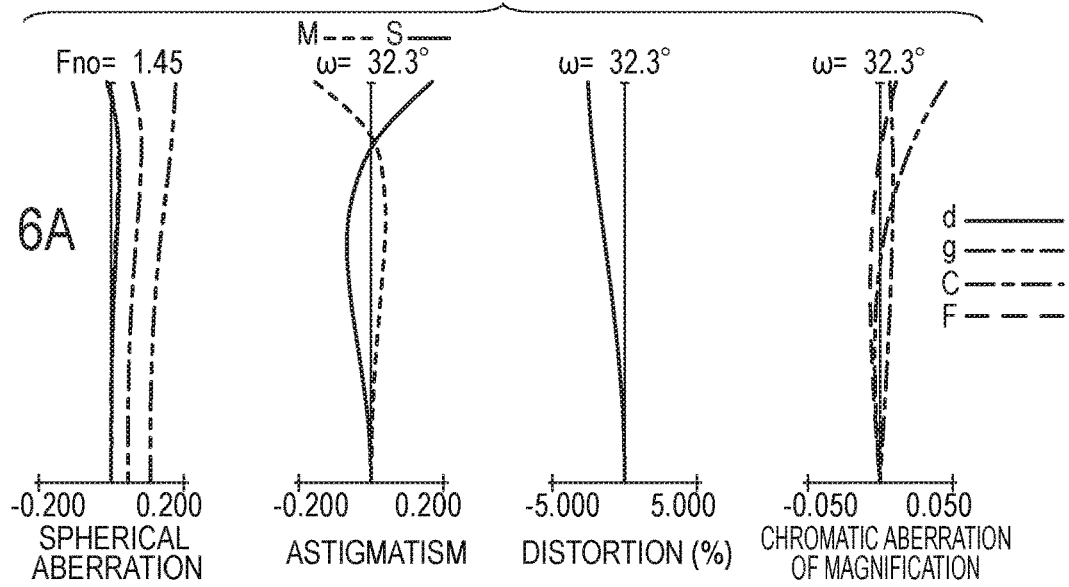
FIG. 6A illustrates longitudinal aberration diagrams of the numerical embodiment 3 at the time of focusing on the infinite-distance object.
Figure 6B:
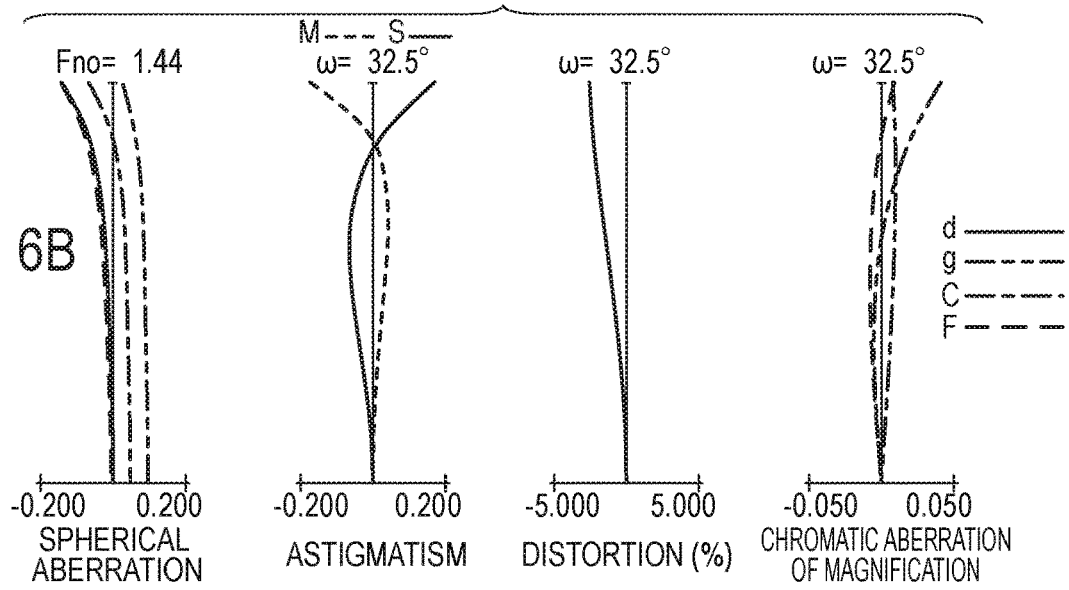
FIG. 6B illustrates more longitudinal aberration diagrams of the numerical embodiment 3 at the time of focusing on the infinite-distance object.
Figure 6C:
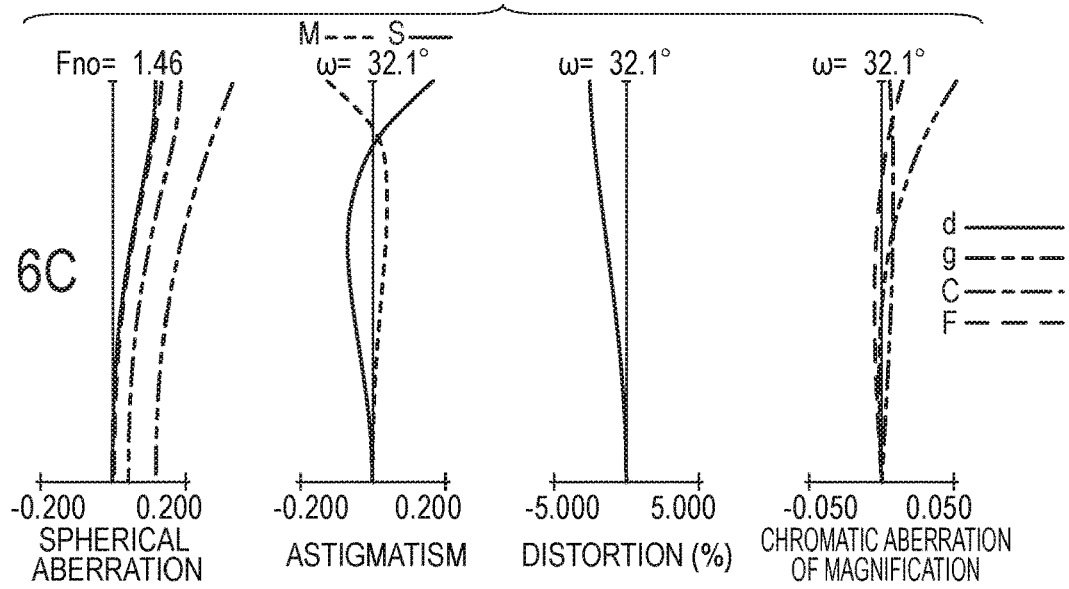
FIG. 6C illustrates more longitudinal aberration diagrams of the numerical embodiment 3 at the time of focusing on the infinite-distance object.

FIG. 6A illustrates longitudinal aberration diagrams at the time of focusing on the infinite-distance object when no spherical aberration is developed by the movement in the direction of the optical axis of the second lens unit L2 of the spherical aberration-variable optical system L. FIG. 6B illustrates longitudinal aberration diagrams at the time of focusing on the infinite-distance object when the negative spherical aberration is developed by the movement in the direction of the optical axis of the second lens unit L2 in the spherical aberration-variable optical system L. FIG. 6C illustrates longitudinal aberration diagrams at the time of focusing on the infinite-distance object when the positive spherical aberration is developed by the movement in the direction of the optical axis of the second lens unit L2 in the spherical aberration-variable optical system L. Note that the longitudinal aberration diagrams of the lens apparatus consisting of the image pickup optical system U of the third embodiment, which are illustrated in FIG. 19, are the same in the first to fourth and sixth to ninth embodiments. As shown in Table 1, regarding the values in this embodiment corresponding to the respective conditional expressions, this embodiment satisfies the conditional expressions (1), (2), and (4) to (6). Thus, the spherical aberration-variable optical system having a small and simple structure is obtained.

Fourth Embodiment

Figure 7:
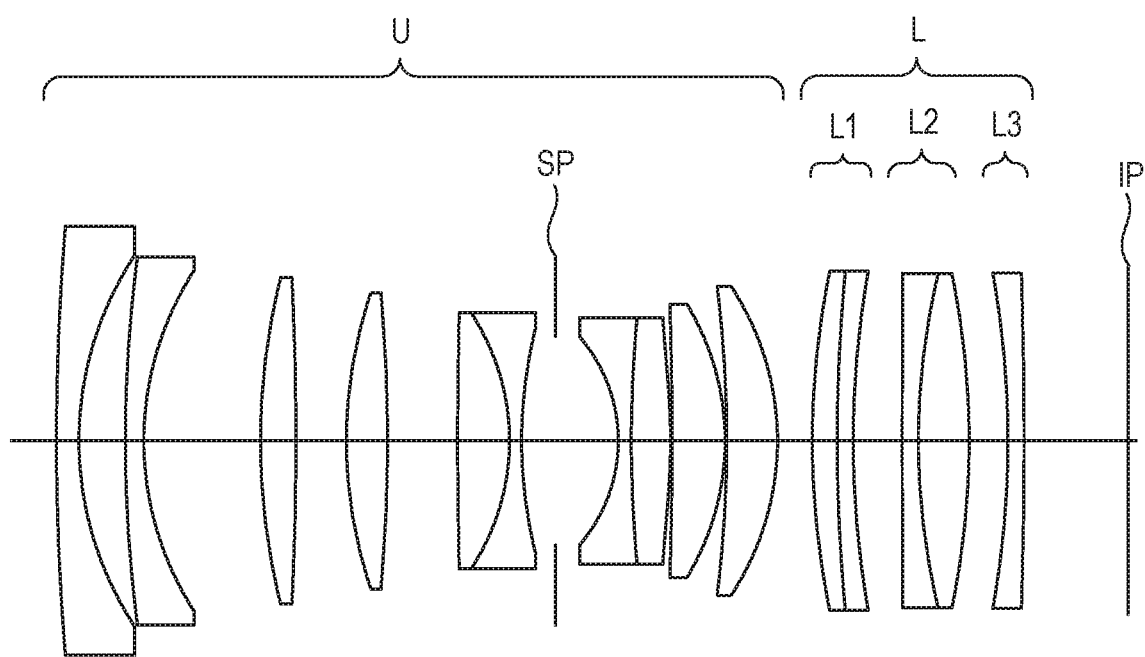
FIG. 7 is a cross-sectional view of a numerical embodiment 4 at the time of focusing on an infinite-distance object.

FIG. 7 is a cross-sectional view of lenses when spherical aberration-variable optical lenses of a fourth embodiment of the disclosure focus on an infinite-distance object. In the fourth embodiment, the configuration of the image pickup optical system U is entirely the same as that of the first embodiment. A description will be given of the lens configurations of the respective lens units in the spherical aberration-variable optical system L according to the fourth embodiment. The first lens unit L1 having the positive refractive power is formed from a cemented lens obtained by joining a positive lens that has a meniscus shape with a convex surface on the object side to a negative lens that has a meniscus shape with a convex surface on the object side. The second lens unit L2 having the positive refractive power is formed from a cemented lens obtained by joining a negative lens that has a meniscus shape with a convex surface on the object side to a positive lens. The third lens unit L3 having the negative refractive power is formed from a negative lens that has a meniscus shape with a concave surface on the object side. The second lens unit L2 is the lens unit that moves independently in the direction of the optical axis and modifies the state of the spherical aberration.

When the negative spherical aberration is developed by the movement in the direction of the optical axis of the second lens unit L2 in the spherical aberration-variable optical system L of the fourth embodiment, the spherical aberration-variable optical lenses have the focal length of 34.10 mm, the half angle of view of 32.39 degrees, and the F-number of 1.45. When no spherical aberration is developed by the movement in the direction of the optical axis of the second lens unit L2 in the spherical aberration-variable optical system L of the fourth embodiment, the spherical aberration-variable optical lenses have the focal length of 34.19 mm, the half angle of view of 32.33 degrees, and the F-number of 1.45. When the positive spherical aberration is developed by the movement in the direction of the optical axis of the second lens unit L2 in the spherical aberration-variable optical system L of the fourth embodiment, the spherical aberration-variable optical lenses have the focal length of 34.28 mm, the half angle of view of 32.26 degrees, and the F-number of 1.45.

Figure 8A:
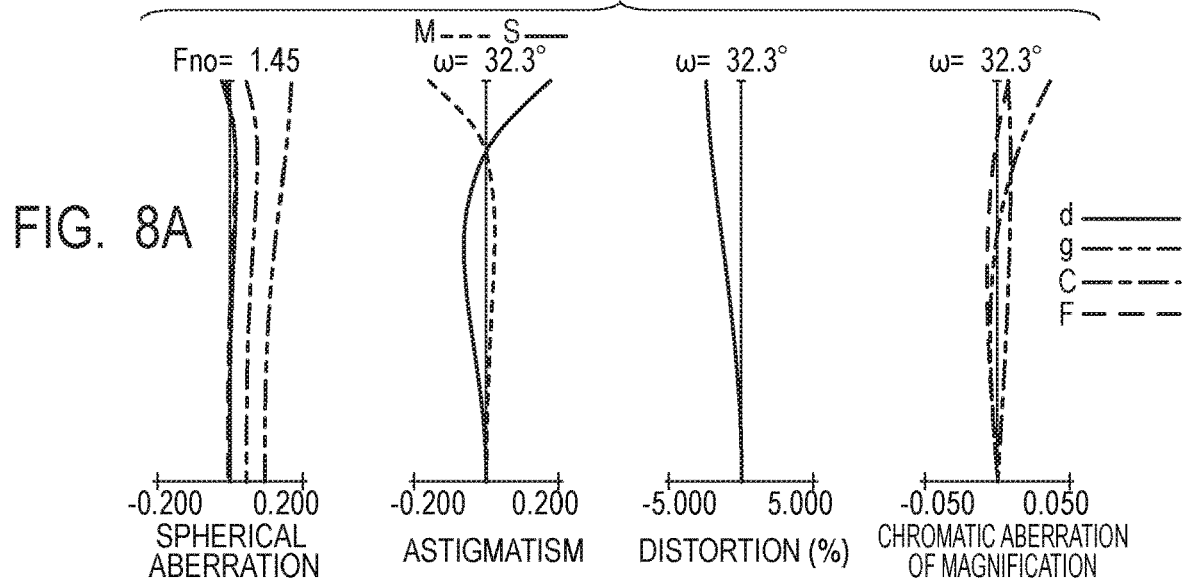
FIG. 8A illustrates longitudinal aberration diagrams of the numerical embodiment 4 at the time of focusing on the infinite-distance object.
Figure 8B:
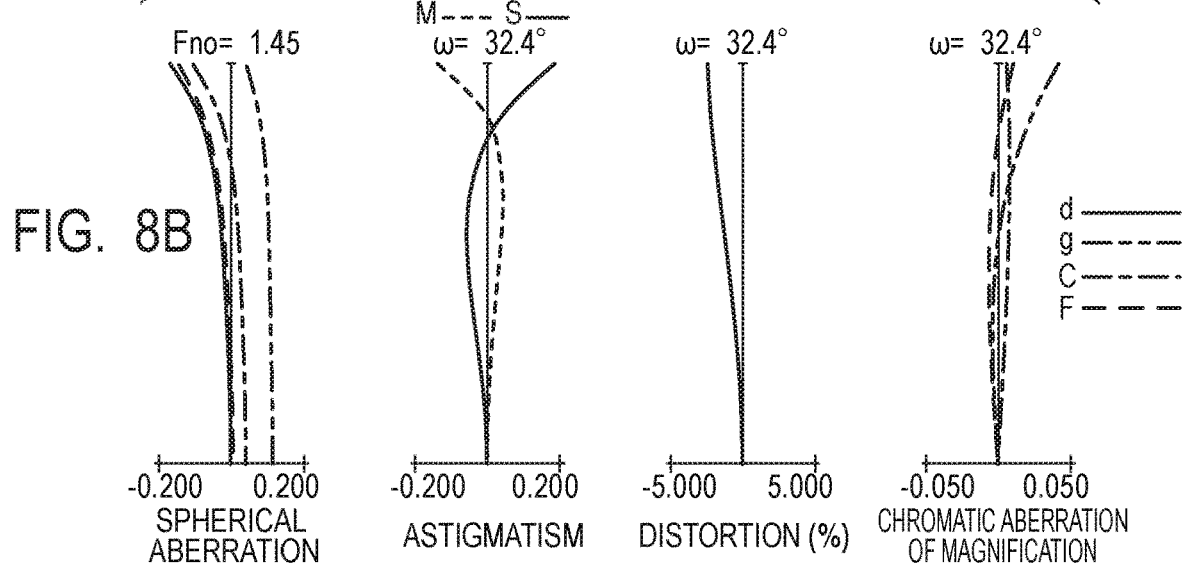
FIG. 8B illustrates more longitudinal aberration diagrams of the numerical embodiment 4 at the time of focusing on the infinite-distance object.
Figure 8C:
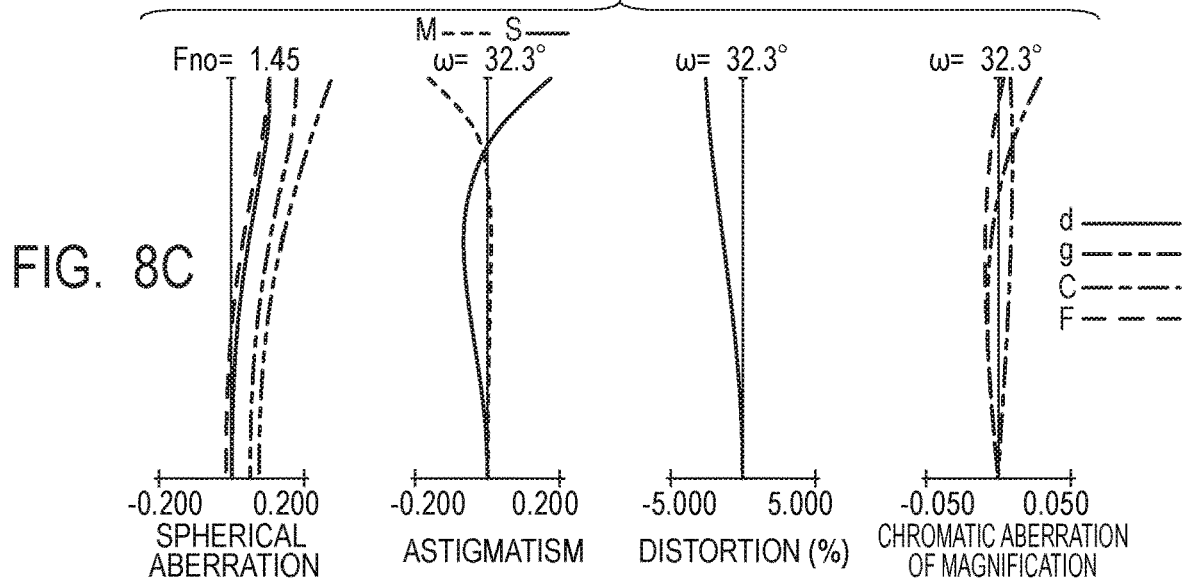
FIG. 8C illustrates more longitudinal aberration diagrams of the numerical embodiment 4 at the time of focusing on the infinite-distance object.

FIG. 8A illustrates longitudinal aberration diagrams at the time of focusing on the infinite-distance object when no spherical aberration is developed by the movement in the direction of the optical axis of the second lens unit L2 of the spherical aberration-variable optical system L. FIG. 8B illustrates longitudinal aberration diagrams at the time of focusing on the infinite-distance object when the negative spherical aberration is developed by the movement in the direction of the optical axis of the second lens unit L2 in the spherical aberration-variable optical system L. FIG. 8C illustrates longitudinal aberration diagrams at the time of focusing on the infinite-distance object when the positive spherical aberration is developed by the movement in the direction of the optical axis of the second lens unit L2 in the spherical aberration-variable optical system L. Note that the longitudinal aberration diagrams of the lens apparatus consisting of the image pickup optical system U of the fourth embodiment, which are illustrated in FIG. 19, are the same in the first to fourth and sixth to ninth embodiments. As shown in Table 1, regarding the values in this embodiment corresponding to the respective conditional expressions, this embodiment satisfies the conditional expressions (1), (2), and (4) to (6). Thus, the spherical aberration-variable optical system having a small and simple structure is obtained.

Fifth Embodiment

Figure 9:
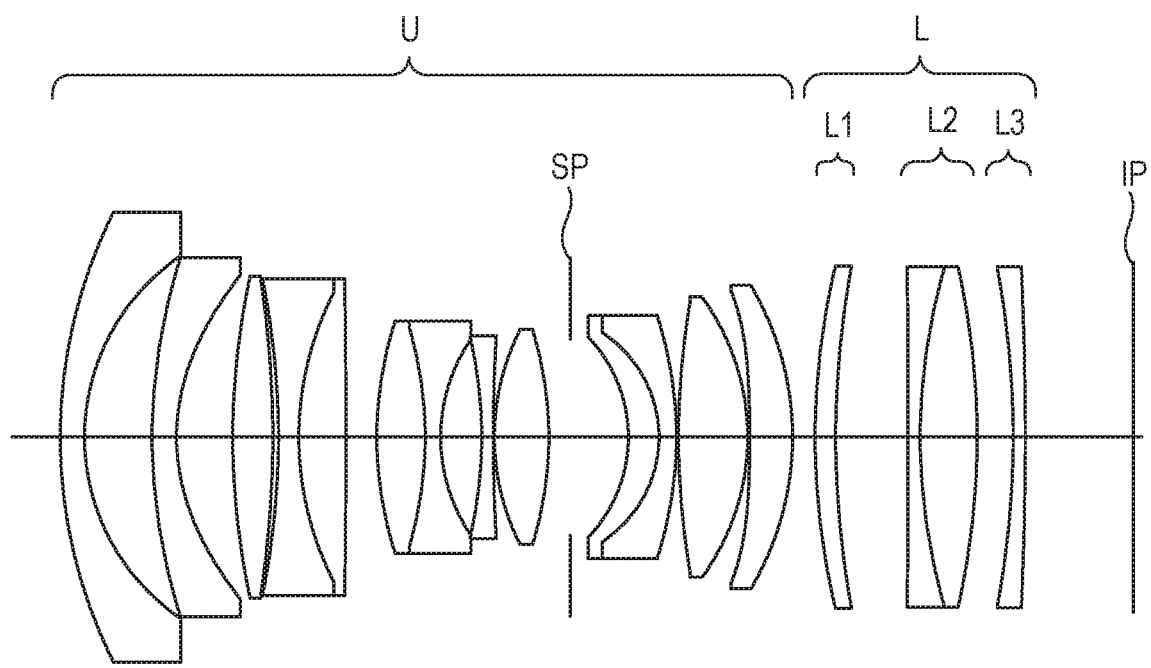
FIG. 9 is a cross-sectional view of a numerical embodiment 5 at the time of focusing on an infinite-distance object.

FIG. 9 is a cross-sectional view of lenses when spherical aberration-variable optical lenses of a fifth embodiment of the disclosure focus on an infinite-distance object. The image pickup optical system U has the positive refractive power as a whole. Reference sign SP denotes the aperture stop. The spherical aberration-variable optical system L has the same configuration as that of the first embodiment. The first lens unit L1 having the positive refractive power is formed from the positive lens that has the meniscus shape with the convex surface on the object side. The second lens unit L2 having the positive refractive power is formed from the cemented lens obtained by joining the negative lens to the positive lens. The third lens unit L3 having the negative refractive power is formed from the negative lens that has the meniscus shape with the concave surface on the object side. The second lens unit L2 is the lens unit that moves independently in the direction of the optical axis and modifies the state of the spherical aberration. Reference sign IP denotes the image plane.

The image pickup optical system U of the fifth embodiment has the focal length of 24.55 mm, the half angle of view of 41.39 degrees, and the F-number of 1.45. When the negative spherical aberration is developed by the movement in the direction of the optical axis of the second lens unit L2 in the spherical aberration-variable optical system L of the fifth embodiment, the spherical aberration-variable optical lenses have the focal length of 24.46 mm, the half angle of view of 41.50 degrees, and the F-number of 1.44. When no spherical aberration is developed by the movement in the direction of the optical axis of the second lens unit L2 in the spherical aberration-variable optical system L of the fifth embodiment, the spherical aberration-variable optical lenses have the focal length of 24.54 mm, the half angle of view of 41.40 degrees, and the F-number of 1.45. When the positive spherical aberration is developed by the movement in the direction of the optical axis of the second lens unit L2 in the spherical aberration-variable optical system L of the fifth embodiment, the spherical aberration-variable optical lenses have the focal length of 24.62 mm, the half angle of view of 41.31 degrees, and the F-number of 1.45.

Figure 10A:
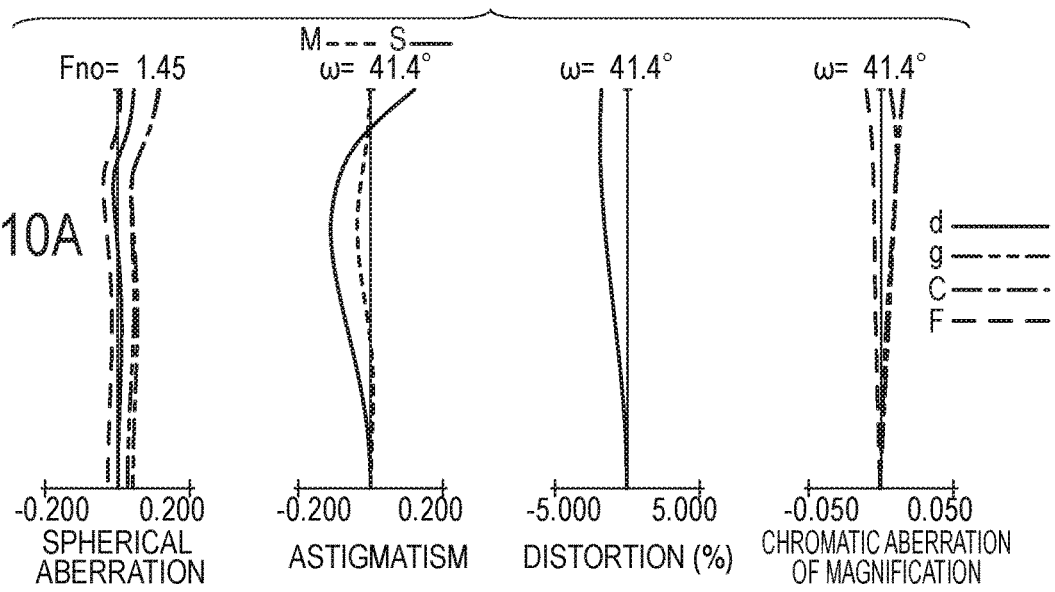
FIG. 10A illustrates longitudinal aberration diagrams of the numerical embodiment 5 at the time of focusing on the infinite-distance object.
Figure 10B:
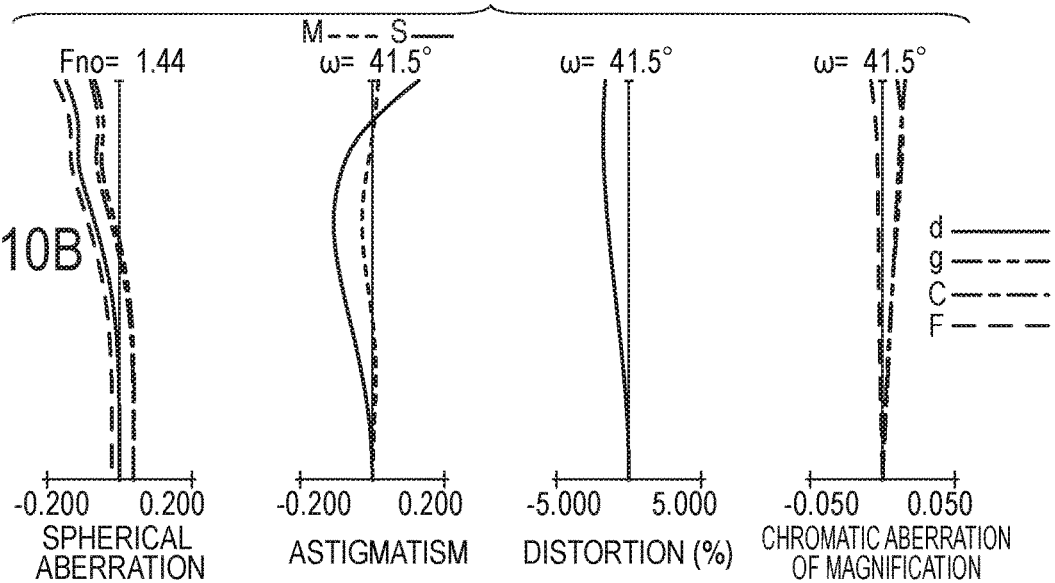
FIG. 10B illustrates more longitudinal aberration diagrams of the numerical embodiment 5 at the time of focusing on the infinite-distance object.
Figure 10C:
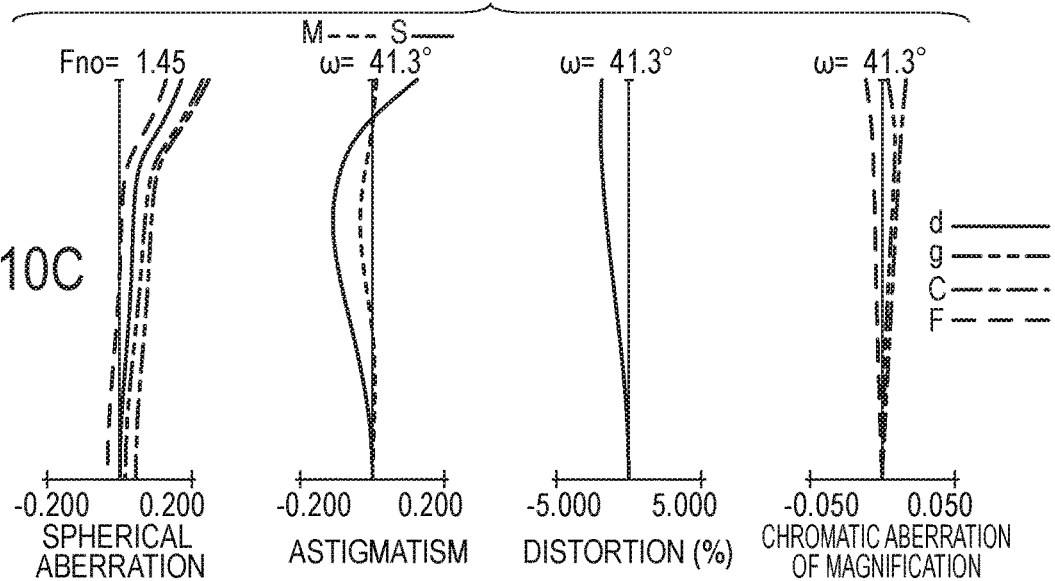
FIG. 10C illustrates more longitudinal aberration diagrams of the numerical embodiment 5 at the time of focusing on the infinite-distance object.
Figure 20:
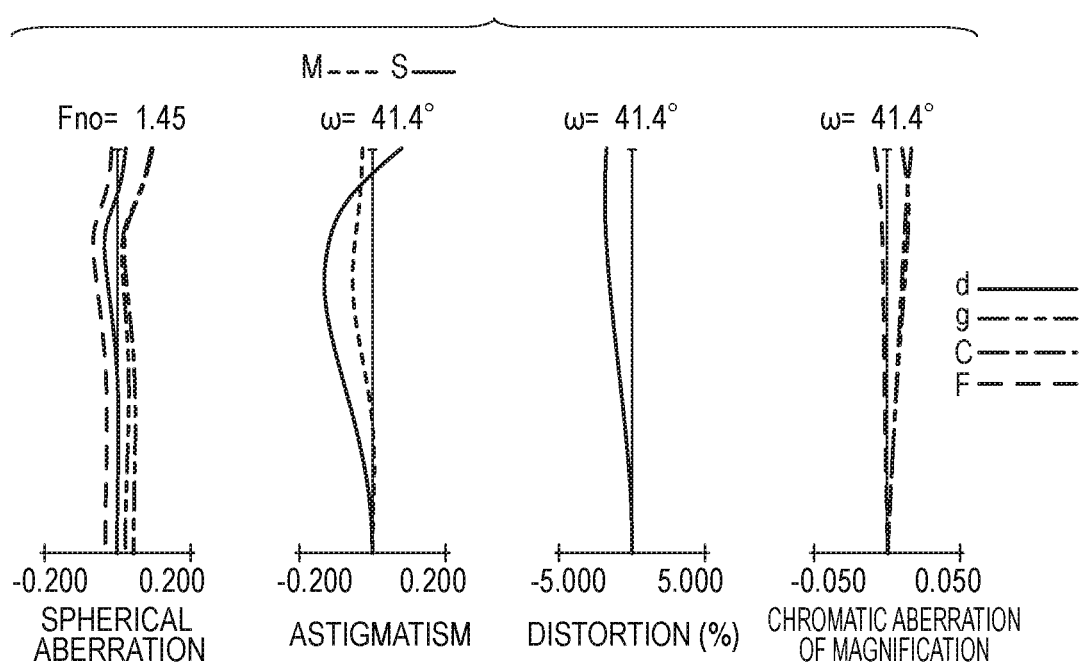
FIG. 20 illustrates longitudinal aberration diagrams of a lens consisting of an image pickup optical lens in the numerical embodiment 5 at the time of focusing on the infinite-distance object.

FIG. 10A illustrates longitudinal aberration diagrams at the time of focusing on the infinite-distance object when no spherical aberration is developed by the movement in the direction of the optical axis of the second lens unit L2 of the spherical aberration-variable optical system L. FIG. 10B illustrates longitudinal aberration diagrams at the time of focusing on the infinite-distance object when the negative spherical aberration is developed by the movement in the direction of the optical axis of the second lens unit L2 in the spherical aberration-variable optical system L. FIG. 10C illustrates longitudinal aberration diagrams at the time of focusing on the infinite-distance object when the positive spherical aberration is developed by the movement in the direction of the optical axis of the second lens unit L2 in the spherical aberration-variable optical system L. FIG. 20 illustrates longitudinal aberration diagrams of a lens apparatus consisting of the image pickup optical system U of the fifth embodiment. As shown in Table 1, regarding the values in this embodiment corresponding to the respective conditional expressions, this embodiment satisfies the conditional expressions (1), (2), and (4) to (6). Thus, the spherical aberration-variable optical system having a small and simple structure is obtained.

Sixth Embodiment

Figure 11:
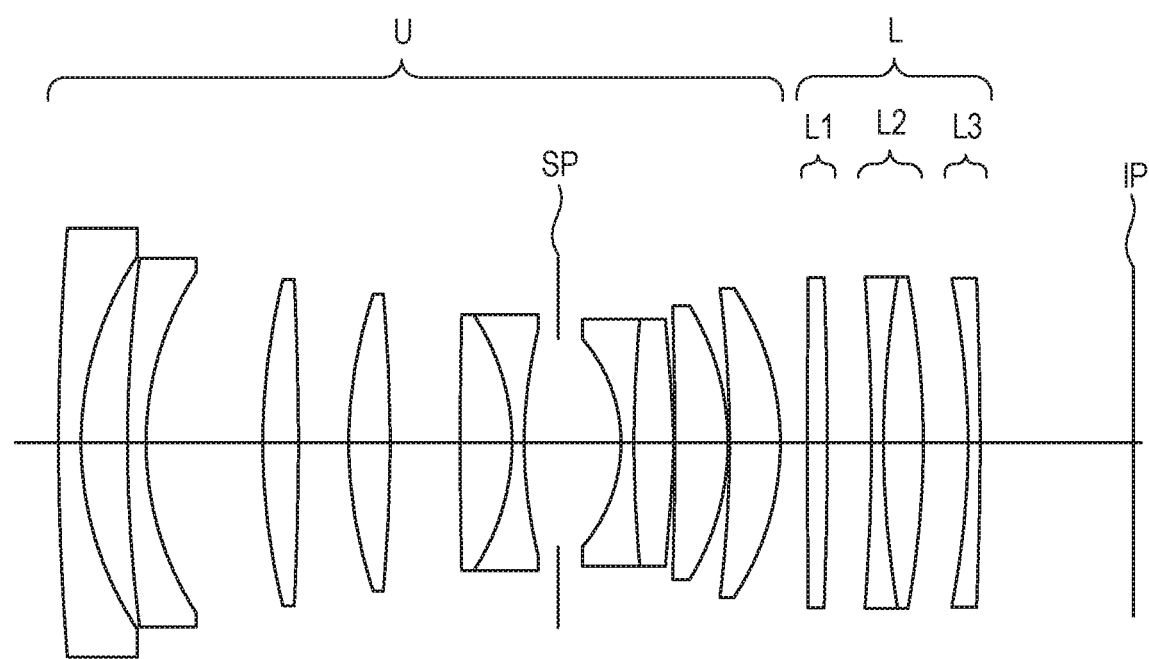
FIG. 11 is a cross-sectional view of a numerical embodiment 6 at the time of focusing on an infinite-distance object.

FIG. 11 is a cross-sectional view of lenses when spherical aberration-variable optical lenses of a sixth embodiment of the disclosure focus on an infinite-distance object. In the sixth embodiment, the configuration of the image pickup optical system U is entirely the same as that of the first embodiment. A description will be given of the lens configurations of the respective lens units in the spherical aberration-variable optical system L according to the sixth embodiment. The first lens unit L1 having the positive refractive power is formed from a positive lens. The second lens unit L2 having the positive refractive power is formed from a cemented lens obtained by joining a negative lens to a positive lens. The third lens unit L3 having the negative refractive power is formed from a negative lens that has a meniscus shape with a concave surface on the object side. The second lens unit L2 is the lens unit that moves independently in the direction of the optical axis and modifies the state of the spherical aberration.

When the negative spherical aberration is developed by the movement in the direction of the optical axis of the second lens unit L2 in the spherical aberration-variable optical system L of the sixth embodiment, the spherical aberration-variable optical lenses have the focal length of 35.82 mm, the half angle of view of 31.13 degrees, and the F-number of 1.52. When no spherical aberration is developed by the movement in the direction of the optical axis of the second lens unit L2 in the spherical aberration-variable optical system L of the sixth embodiment, the spherical aberration-variable optical lenses have the focal length of 35.91 mm, the half angle of view of 31.07 degrees, and the F-number of 1.52. When the positive spherical aberration is developed by the movement in the direction of the optical axis of the second lens unit L2 in the spherical aberration- variable optical system L of the sixth embodiment, the spherical aberration-variable optical lenses have the focal length of 36.00 mm, the half angle of view of 31.01 degrees, and the F-number of 1.53.

Figure 12A:
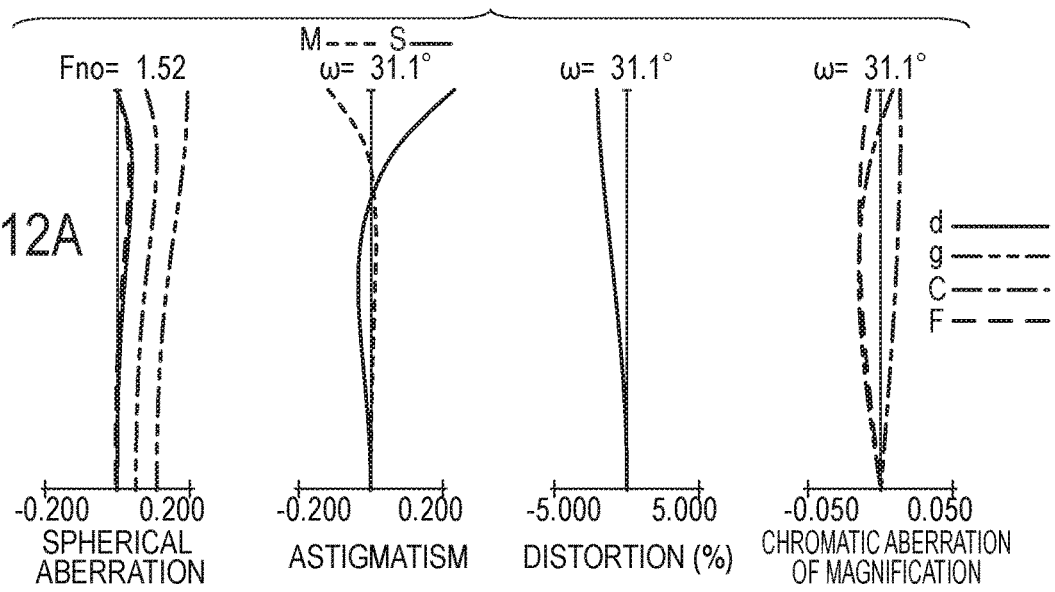
FIG. 12A illustrates longitudinal aberration diagrams of the numerical embodiment 6 at the time of focusing on the infinite-distance object.
Figure 12B:
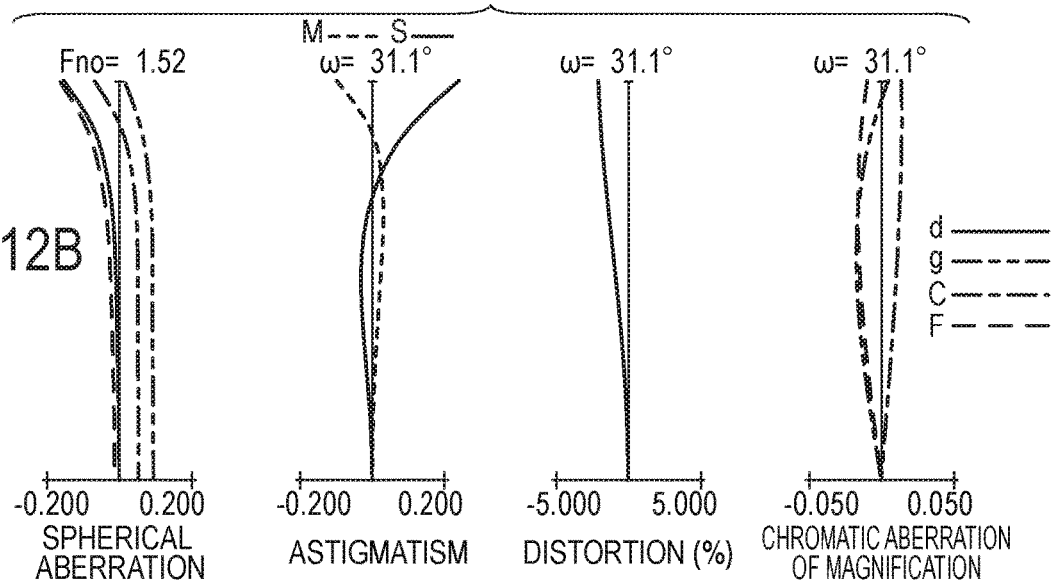
FIG. 12B illustrates more longitudinal aberration diagrams of the numerical embodiment 6 at the time of focusing on the infinite-distance object.
Figure 12C:
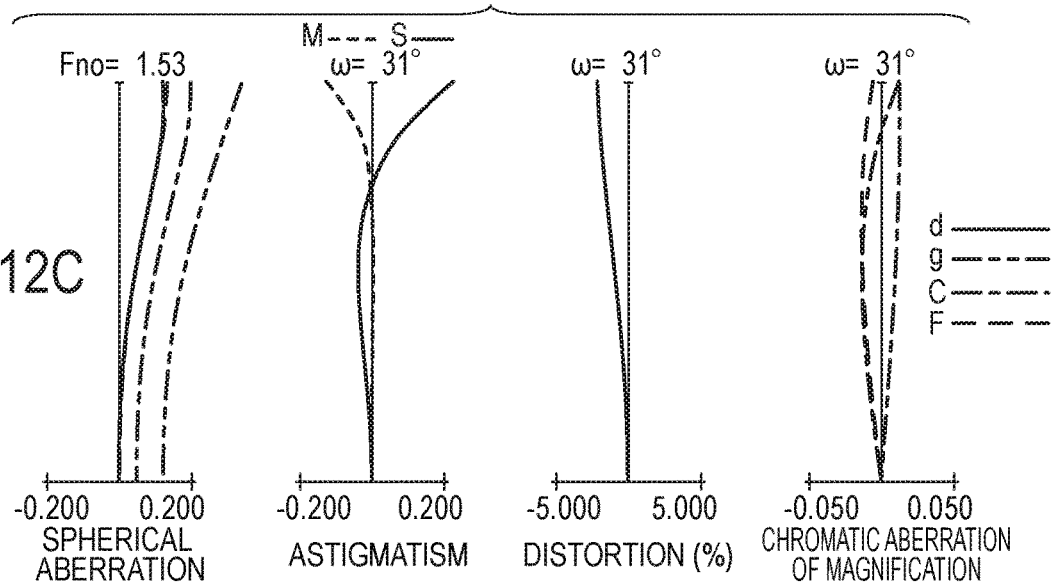
FIG. 12C illustrates more longitudinal aberration diagrams of the numerical embodiment 6 at the time of focusing on the infinite-distance object.

FIG. 12A illustrates longitudinal aberration diagrams at the time of focusing on the infinite-distance object when no spherical aberration is developed by the movement in the direction of the optical axis of the second lens unit L2 of the spherical aberration-variable optical system L. FIG. 12B illustrates longitudinal aberration diagrams at the time of focusing on the infinite-distance object when the negative spherical aberration is developed by the movement in the direction of the optical axis of the second lens unit L2 in the spherical aberration-variable optical system L. FIG. 12C illustrates longitudinal aberration diagrams at the time of focusing on the infinite-distance object when the positive spherical aberration is developed by the movement in the direction of the optical axis of the second lens unit L2 in the spherical aberration-variable optical system L. Note that the longitudinal aberration diagrams of the lens apparatus consisting of the image pickup optical system U of the sixth embodiment, which are illustrated in FIG. 19, are the same in the first to fourth and sixth to ninth embodiments. As shown in Table 1, regarding the values in this embodiment corresponding to the respective conditional expressions, this embodiment satisfies the conditional expressions (1), (2), and (4) to (6). Thus, the spherical aberration-variable optical system having a small and simple structure is obtained.

Seventh Embodiment

Figure 13:
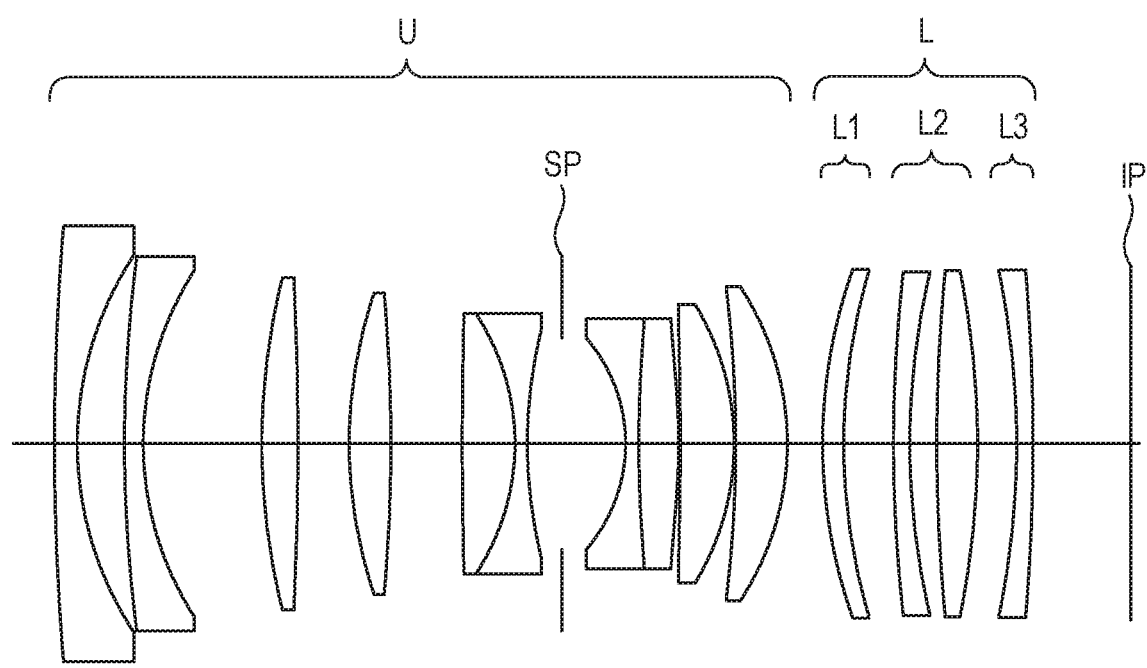
FIG. 13 is a cross-sectional view of a numerical embodiment 7 at the time of focusing on an infinite-distance object.

FIG. 13 is a cross-sectional view of lenses when spherical aberration-variable optical lenses of a seventh embodiment of the disclosure focus on an infinite-distance object. In the seventh embodiment, the configuration of the image pickup optical system U is entirely the same as that of the first embodiment. A description will be given of the lens configurations of the respective lens units in the spherical aberration-variable optical system L according to the seventh embodiment. The first lens unit L1 having the positive refractive power is formed from a positive lens that has a meniscus shape with a convex surface on the object side. The second lens unit L2 having the positive refractive power is formed from a negative lens that has a meniscus shape with a convex surface on the object side and from a positive lens. The third lens unit L3 having the negative refractive power is formed from a negative lens that has a meniscus shape with a concave surface on the object side. The second lens unit L2 is the lens unit that moves independently in the direction of the optical axis and modifies the state of the spherical aberration.

When the negative spherical aberration is developed by the movement in the direction of the optical axis of the second lens unit L2 in the spherical aberration-variable optical system L of the seventh embodiment, the spherical aberration-variable optical lenses have the focal length of 33.33 mm, the half angle of view of 32.99 degrees, and the F-number of 1.41. When no spherical aberration is developed by the movement in the direction of the optical axis of the second lens unit L2 in the spherical aberration-variable optical system L of the seventh embodiment, the spherical aberration-variable optical lenses have the focal length of 33.52 mm, the half angle of view of 32.84 degrees, and the F-number of 1.42. When the positive spherical aberration is developed by the movement in the direction of the optical axis of the second lens unit L2 in the spherical aberration- variable optical system L of the seventh embodiment, the spherical aberration-variable optical lenses have the focal length of 33.56 mm, the half angle of view of 32.81 degrees, and the F-number of 1.42.

Figure 14A:
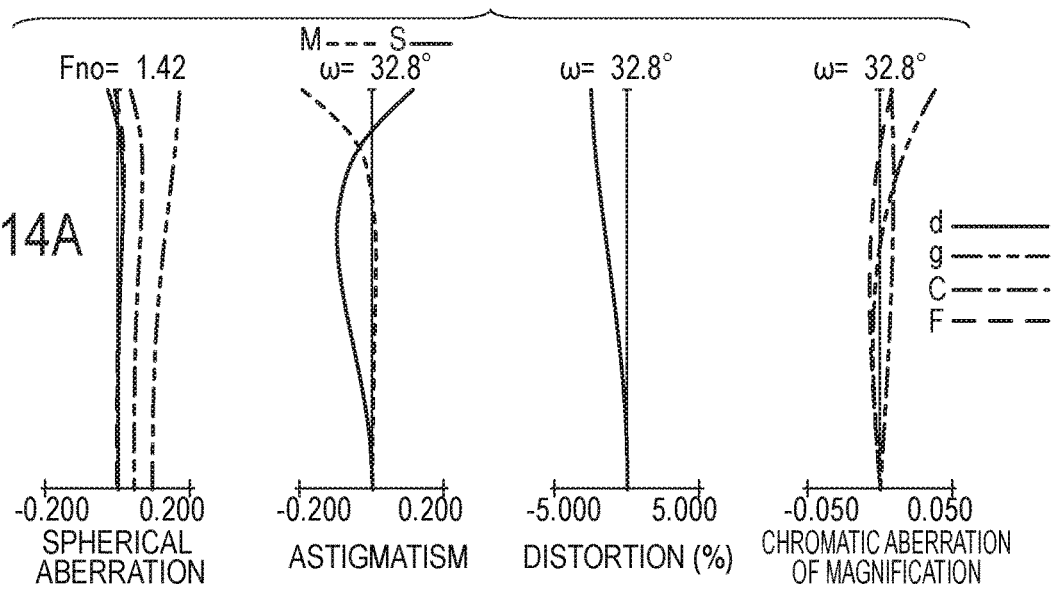
FIG. 14A illustrates longitudinal aberration diagrams of the numerical embodiment 7 at the time of focusing on the infinite-distance object.
Figure 14B:
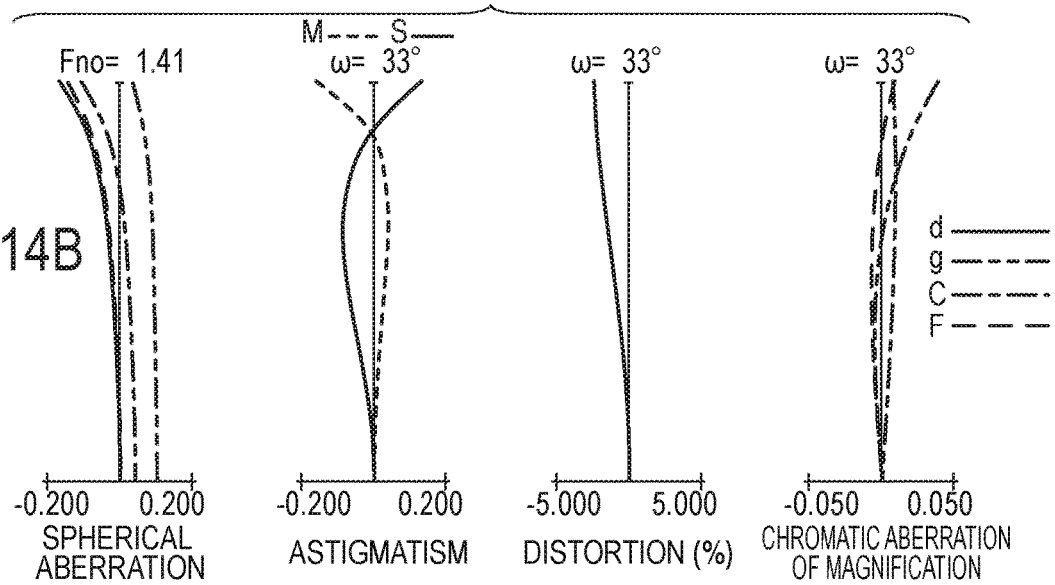
FIG. 14B illustrates more longitudinal aberration diagrams of the numerical embodiment 7 at the time of focusing on the infinite-distance object.
Figure 14C:
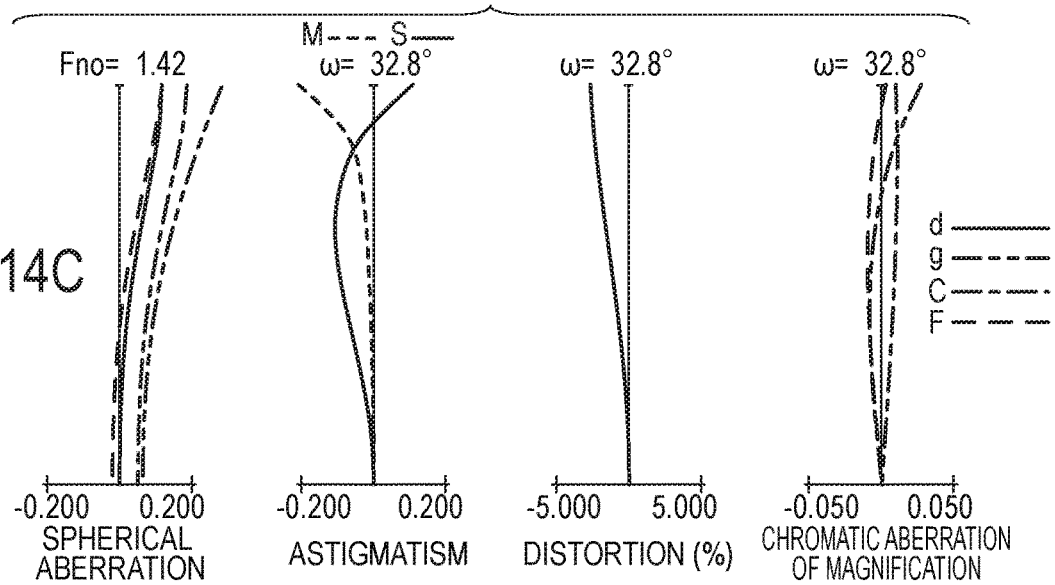
FIG. 14C illustrates more longitudinal aberration diagrams of the numerical embodiment 7 at the time of focusing on the infinite-distance object.

FIG. 14A illustrates longitudinal aberration diagrams at the time of focusing on the infinite-distance object when no spherical aberration is developed by the movement in the direction of the optical axis of the second lens unit L2 of the spherical aberration-variable optical system L. FIG. 14B illustrates longitudinal aberration diagrams at the time of focusing on the infinite-distance object when the negative spherical aberration is developed by the movement in the direction of the optical axis of the second lens unit L2 in the spherical aberration-variable optical system L. FIG. 14C illustrates longitudinal aberration diagrams at the time of focusing on the infinite-distance object when the positive spherical aberration is developed by the movement in the direction of the optical axis of the second lens unit L2 in the spherical aberration-variable optical system L. Note that the longitudinal aberration diagrams of the lens apparatus consisting of the image pickup optical system U of the seventh embodiment, which are illustrated in FIG. 19, are the same in the first to fourth and sixth to ninth embodiments. As shown in Table 1, regarding the values in this embodiment corresponding to the respective conditional expressions, this embodiment satisfies the conditional expressions (1), (2), and (4) to (6). Thus, the spherical aberration-variable optical system having a small and simple structure is obtained.

Eighth Embodiment

Figure 15:
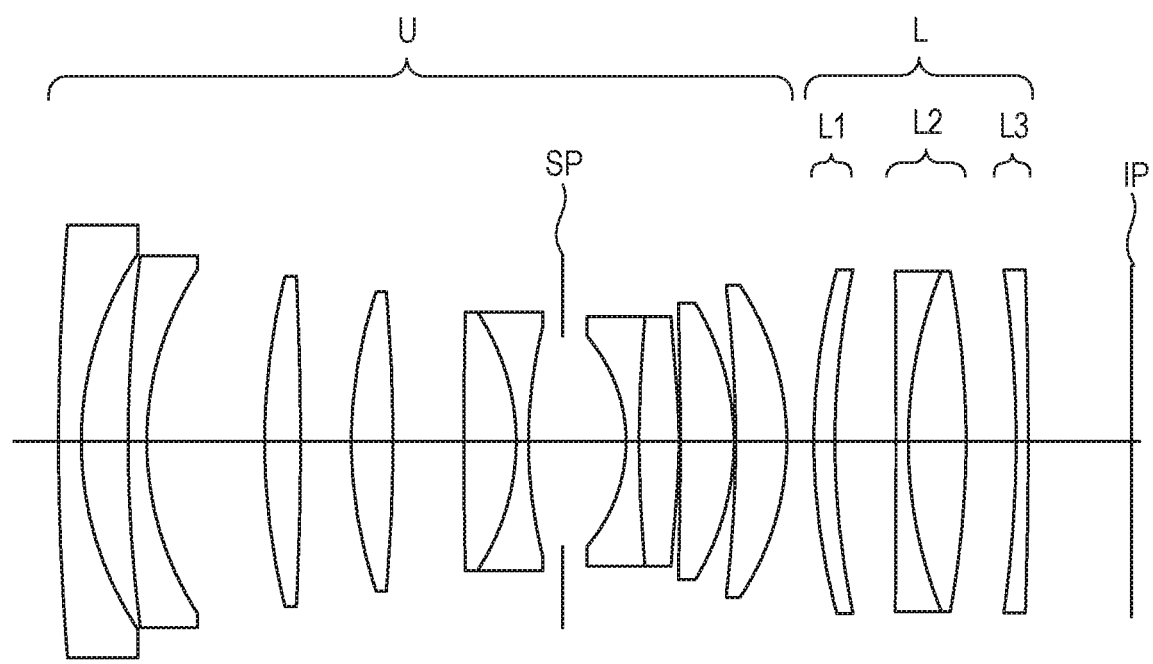
FIG. 15 is a cross-sectional view of a numerical embodiment 8 at the time of focusing on an infinite-distance object.

FIG. 15 is a cross-sectional view of lenses when spherical aberration-variable optical lenses of an eighth embodiment of the disclosure focus on an infinite-distance object. In the eighth embodiment, the configuration of the image pickup optical system U is entirely the same as that of the first embodiment. A description will be given of the lens configurations of the respective lens units in the spherical aberration-variable optical system L according to the eighth embodiment. The first lens unit L1 having the positive refractive power is formed from a positive lens that has a meniscus shape with a convex surface on the object side. The second lens unit L2 having the positive refractive power is formed from a cemented lens obtained by joining a negative lens to a positive lens. The third lens unit L3 having the negative refractive power is formed from a negative lens that has a meniscus shape with a concave surface on the object side. The second lens unit L2 is the lens unit that moves independently in the direction of the optical axis and modifies the state of the spherical aberration.

When the negative spherical aberration is developed by the movement in the direction of the optical axis of the second lens unit L2 in the spherical aberration-variable optical system L of the eighth embodiment, the spherical aberration-variable optical lenses have the focal length of 33.99 mm, the half angle of view of 32.48 degrees, and the F-number of 1.44. When no spherical aberration is developed by the movement in the direction of the optical axis of the second lens unit L2 in the spherical aberration-variable optical system L of the eighth embodiment, the spherical aberration-variable optical lenses have the focal length of 33.98 mm, the half angle of view of 32.49 degrees, and the F-number of 1.44. When the positive spherical aberration is developed by the movement in the direction of the optical axis of the second lens unit L2 in the spherical aberration-variable optical system L of the eighth embodiment, the spherical aberration-variable optical lenses have the focal length of 33.95 mm, the half angle of view of 32.50 degrees, and the F-number of 1.44.

Figure 16A:
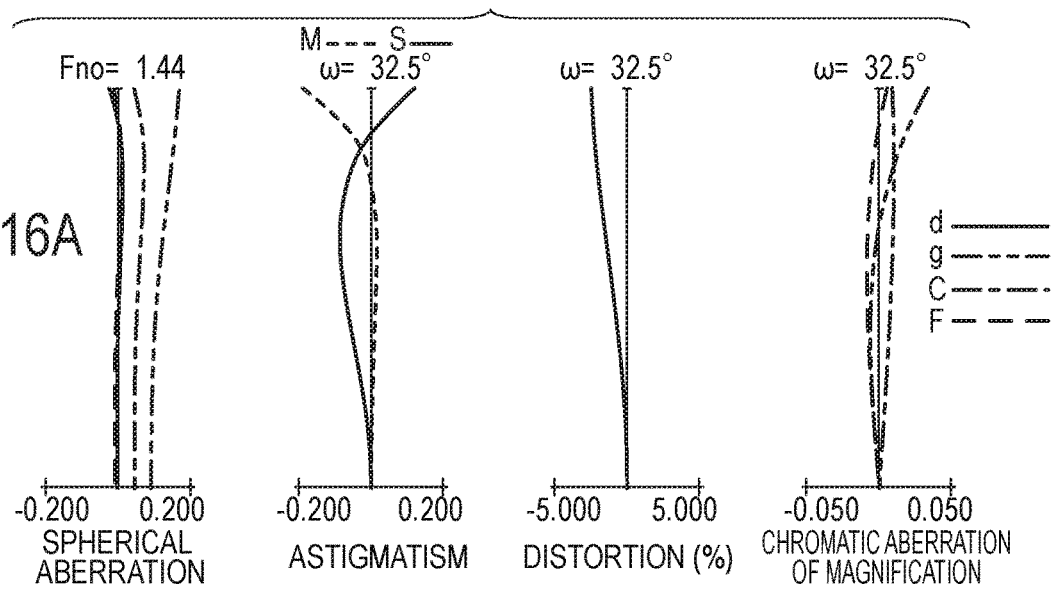
FIG. 16A illustrates longitudinal aberration diagrams of the numerical embodiment 8 at the time of focusing on the infinite-distance object.
Figure 16B:
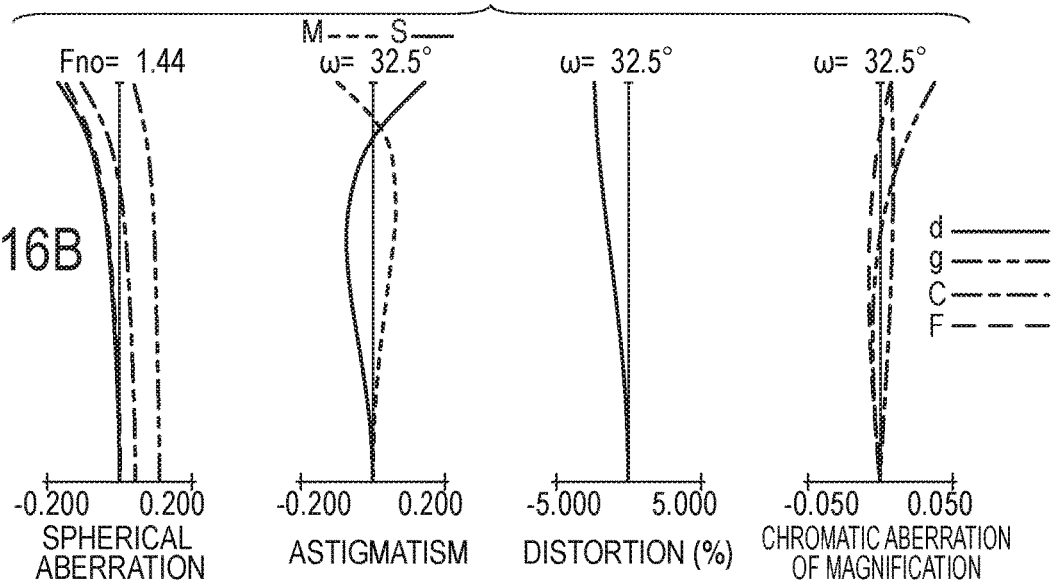
FIG. 16B illustrates more longitudinal aberration diagrams of the numerical embodiment 8 at the time of focusing on the infinite-distance object.
Figure 16C:
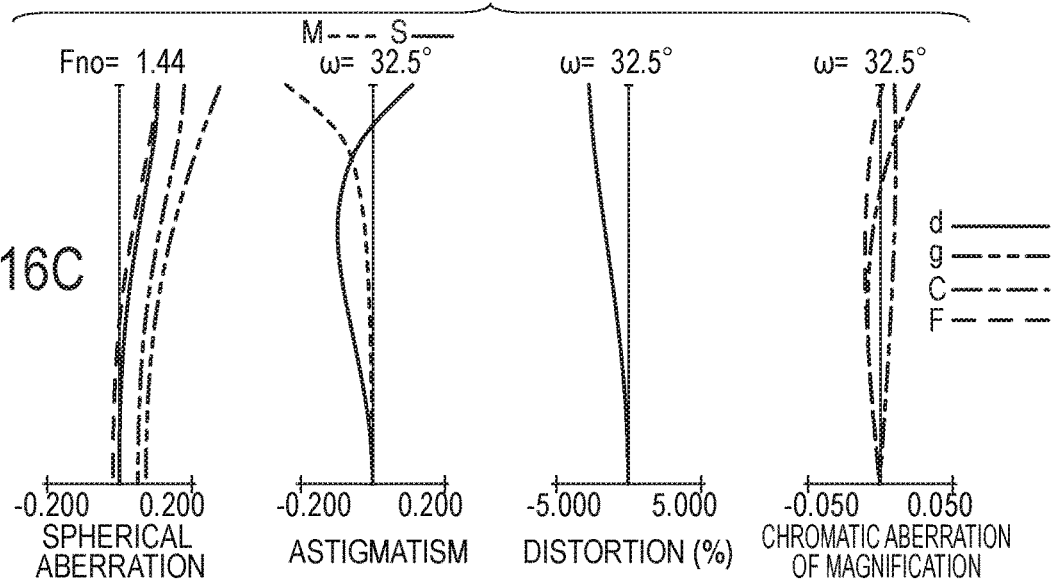
FIG. 16C illustrates more longitudinal aberration diagrams of the numerical embodiment 8 at the time of focusing on the infinite-distance object.

FIG. 16A illustrates longitudinal aberration diagrams at the time of focusing on the infinite-distance object when no spherical aberration is developed by the movement in the direction of the optical axis of the second lens unit L2 of the spherical aberration-variable optical system L. FIG. 16B illustrates longitudinal aberration diagrams at the time of focusing on the infinite-distance object when the negative spherical aberration is developed by the movement in the direction of the optical axis of the second lens unit L2 in the spherical aberration-variable optical system L. FIG. 16C illustrates longitudinal aberration diagrams at the time of focusing on the infinite-distance object when the positive spherical aberration is developed by the movement in the direction of the optical axis of the second lens unit L2 in the spherical aberration-variable optical system L. Note that the longitudinal aberration diagrams of the lens apparatus consisting of the image pickup optical system U of the eighth embodiment, which are illustrated in FIG. 19, are the same in the first to fourth and sixth to ninth embodiments. As shown in Table 1, regarding the values in this embodiment corresponding to the respective conditional expressions, this embodiment satisfies the conditional expressions (1), (2), and (4) to (6). Thus, the spherical aberration-variable optical system having a small and simple structure is obtained.

Ninth Embodiment

Figure 17:
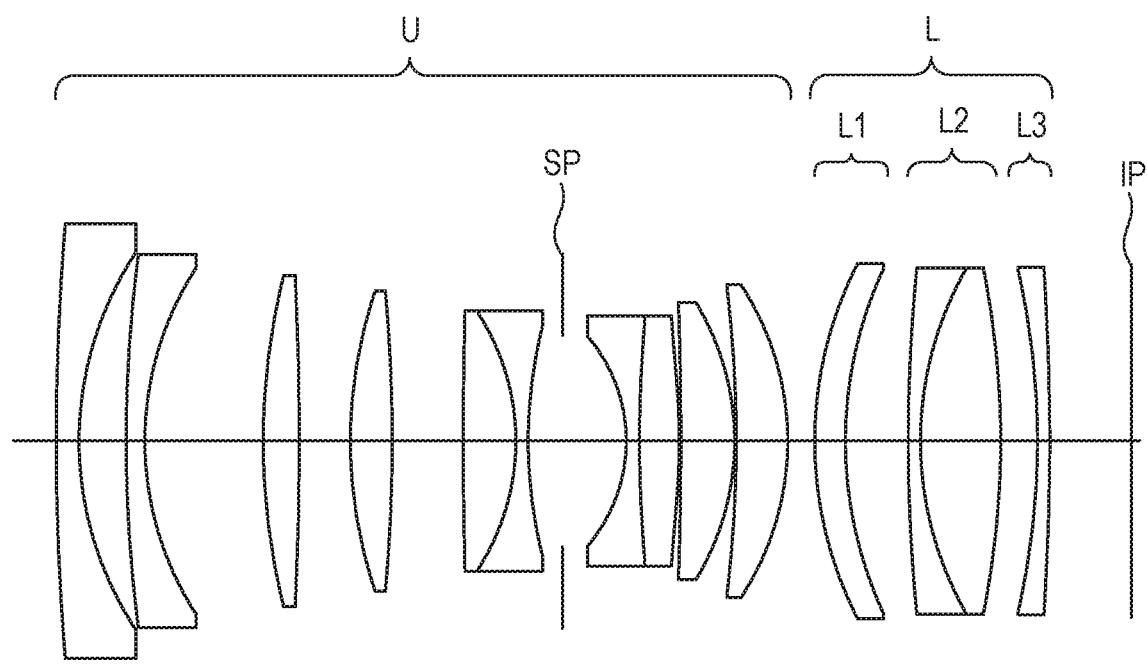
FIG. 17 is a cross-sectional view of a numerical embodiment 9 at the time of focusing on an infinite-distance object.

FIG. 17 is a cross-sectional view of lenses when spherical aberration-variable optical lenses of a ninth embodiment of the disclosure focus on an infinite-distance object. In the ninth embodiment, the configuration of the image pickup optical system U is entirely the same as that of the first embodiment. A description will be given of the lens configurations of the respective lens units in the spherical aberration-variable optical system L according to the ninth embodiment. The first lens unit L1 having the positive refractive power is formed from a positive lens that has a meniscus shape with a convex surface on the object side. The second lens unit L2 having the positive refractive power is formed from a cemented lens obtained by joining a negative lens to a positive lens. The third lens unit L3 having the negative refractive power is formed from a negative lens that has a meniscus shape with a concave surface on the object side. The second lens unit L2 is the lens unit that moves independently in the direction of the optical axis and modifies the state of the spherical aberration.

When the negative spherical aberration is developed by the movement in the direction of the optical axis of the second lens unit L2 in the spherical aberration-variable optical system L of the ninth embodiment, the spherical aberration-variable optical lenses have the focal length of 32.31 mm, the half angle of view of 33.81 degrees, and the F-number of 1.37. When no spherical aberration is developed by the movement in the direction of the optical axis of the second lens unit L2 in the spherical aberration-variable optical system L of the ninth embodiment, the spherical aberration-variable optical lenses have the focal length of 32.49 mm, the half angle of view of 33.66 degrees, and the F-number of 1.38. When the positive spherical aberration is developed by the movement in the direction of the optical axis of the second lens unit L2 in the spherical aberration-variable optical system L of the ninth embodiment, the spherical aberration-variable optical lenses have the focal length of 32.67 mm, the half angle of view of 33.52 degrees, and the F-number of 1.38.

Figure 18A:
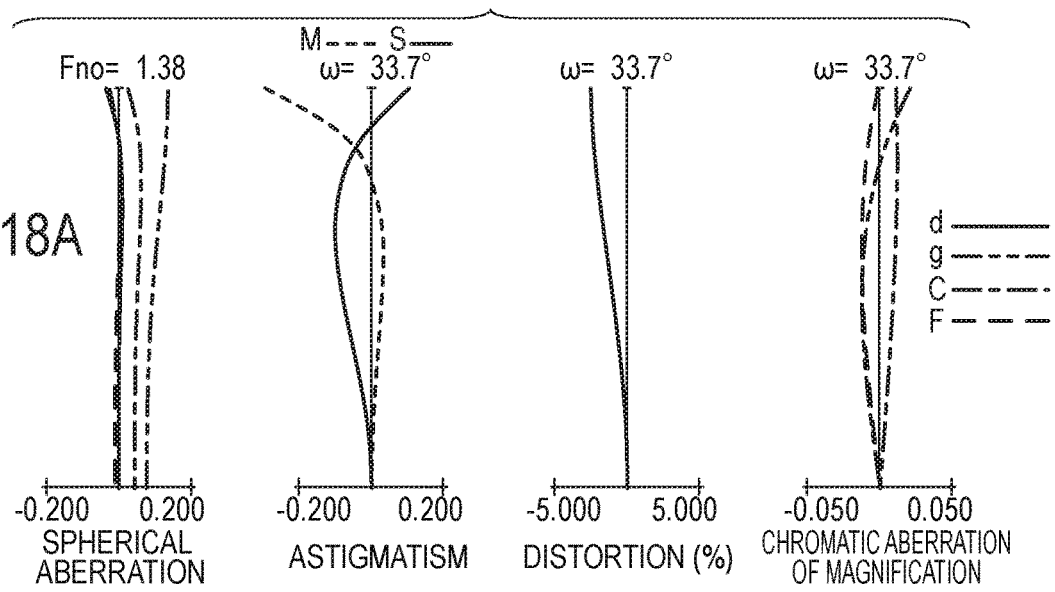
FIG. 18A illustrates longitudinal aberration diagrams of the numerical embodiment 9 at the time of focusing on the infinite-distance object.
Figure 18B:
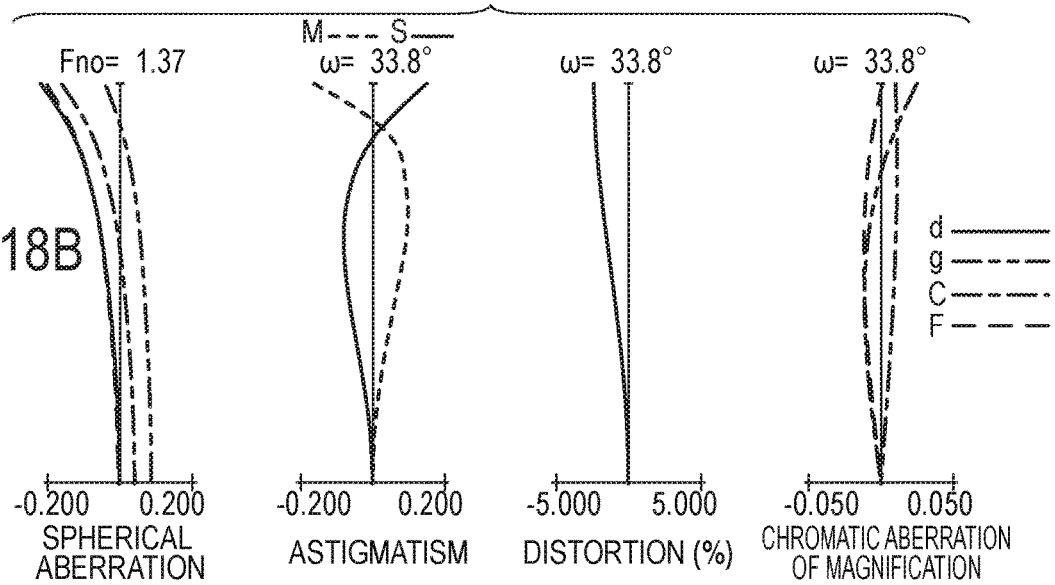
FIG. 18B illustrates more longitudinal aberration diagrams of the numerical embodiment 9 at the time of focusing on the infinite-distance object.
Figure 18C:
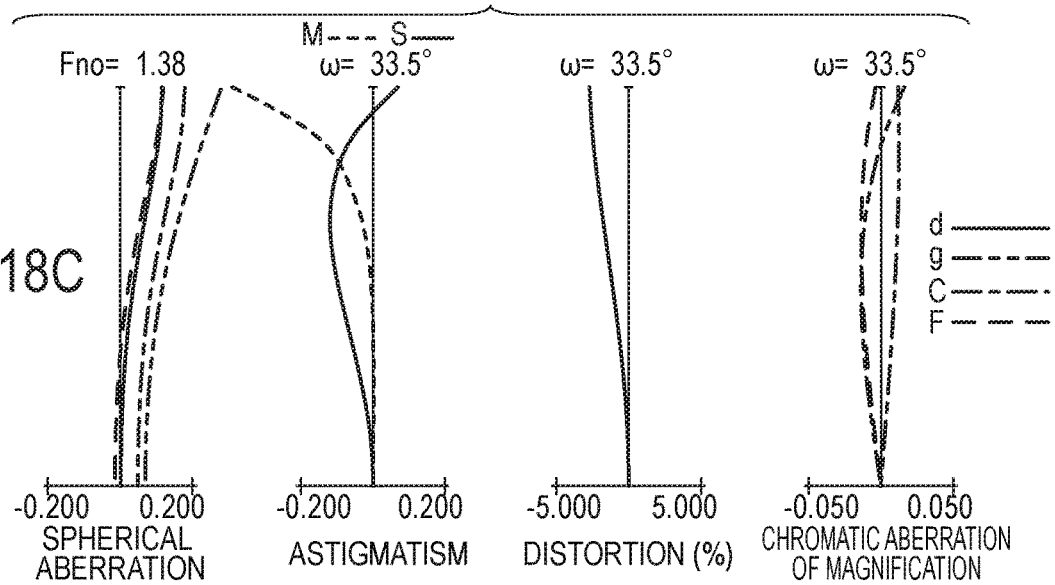
FIG. 18C illustrates more longitudinal aberration diagrams of the numerical embodiment 9 at the time of focusing on the infinite-distance object.

FIG. 18A illustrates longitudinal aberration diagrams at the time of focusing on the infinite-distance object when no spherical aberration is developed by the movement in the direction of the optical axis of the second lens unit L2 of the spherical aberration-variable optical system L. FIG. 18B illustrates longitudinal aberration diagrams at the time of focusing on the infinite-distance object when the negative spherical aberration is developed by the movement in the direction of the optical axis of the second lens unit L2 in the spherical aberration-variable optical system L. FIG. 18C illustrates longitudinal aberration diagrams at the time of focusing on the infinite-distance object when the positive spherical aberration is developed by the movement in the direction of the optical axis of the second lens unit L2 in the spherical aberration-variable optical system L. Note that the longitudinal aberration diagrams of the lens apparatus consisting of the image pickup optical system U of the ninth embodiment, which are illustrated in FIG. 19, are the same in the first to fourth and sixth to ninth embodiments. As shown in Table 1, regarding the values in this embodiment corresponding to the respective conditional expressions, this embodiment satisfies the conditional expressions (1), (2), and (4) to (6). Thus, the spherical aberration-variable optical system having a small and simple structure is obtained.

Numerical embodiments corresponding to these embodiments are shown below. In the following, a state where the negative spherical aberration is developed by the movement of the second lens unit L2 of the spherical aberration-variable optical system L will be indicated as "under", a state where the positive spherical aberration is developed likewise will be indicated with "over", and a state where a spherical aberration equivalent to that only with the image pickup optical system U is developed likewise will be indicated with "normal". An aspherical shape in each embodiment is defined by the following formula. In addition, the values in these embodiments corresponding to the respective conditional expressions are shown in Table 1.

$$X = \frac{(1/R)H^2}{1+\sqrt{1-(1+K)(H/R)^2}} + A3 \cdot H^3 + A4 \cdot H^4 + A5 \cdot H^5 + A6 \cdot H^6 +$$
$$A7 \cdot H^7 + A8 \cdot H^8 + A9 \cdot H^9 + A10 \cdot H^{10} + A11 \cdot H^{11} + A12 \cdot H^{12}$$

Here, A3 to A12 are aspherical coefficients. The aspherical shape is expressed by a displacement x in the direction of the optical axis based on a surface vertex at a position at a height H from the optical axis. Note that R is a paraxial radius of curvature and K is a conic constant.

Figure 21:
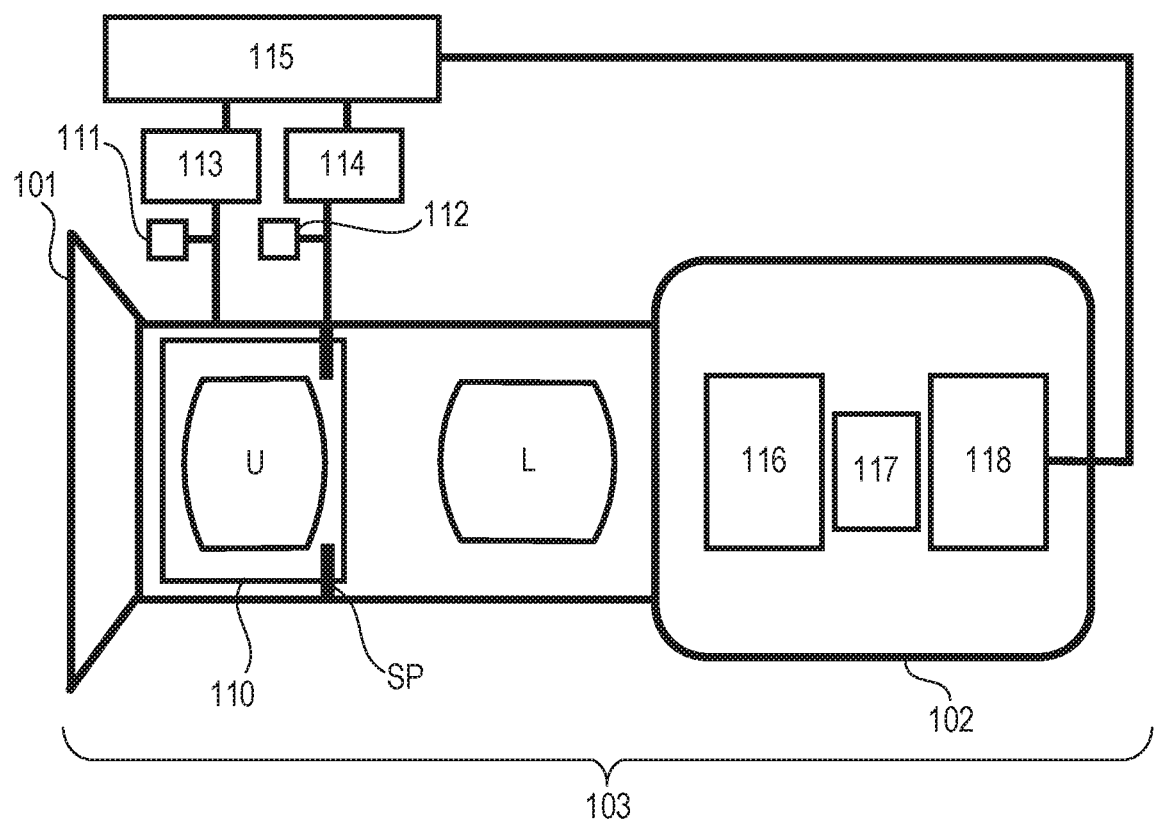
FIG. 21 is a schematic diagram of a substantial part of an image pickup apparatus including a spherical aberration-variable optical system of the disclosure.

FIG. 21 is a schematic diagram of an image pickup apparatus (an image pickup unit) (a television camera system) in which the spherical aberration-variable optical system of any of the embodiments is provided integrally on the image side of an image pickup optical system. In FIG. 21, reference sign 101 denotes a lens apparatus including the spherical aberration-variable optical system of any one of the first to ninth embodiments. Reference sign 102 denotes a camera device. The lens apparatus 101 is attachable to and detachable from the camera device 102. Reference sign 103 denotes an image pickup apparatus which is formed by attaching the lens apparatus 101 to the camera device 102. The lens apparatus 101 includes the image pickup optical system U and the spherical aberration-variable optical system L. The image pickup optical system U includes a focusing lens unit. Reference sign SP denotes the aperture stop. Reference sign 110 denotes a driving mechanism such as a helicoid and a cam, which drives the focusing lens unit in the image pickup optical system U in the direction of the optical axis. Reference signs 113 and 114 denote motors (driving units) that electrically drive the driving mechanism 110 and the aperture stop SP. Reference signs 111 and 112 denote detectors such as encoders, potentiometers, and photosensors for detecting a position of the image pickup optical system U on the optical axis and an aperture size of the aperture stop SP. In the camera device 102, reference sign 116 denotes a glass block that corresponds to an optical filter and a color separation optical system in the camera device 102, and reference sign 117 denotes a solid-state image pickup element (a photoelectric conversion element) such as a CCD sensor and a CMOS sensor to receive an object image formed by the lens apparatus 101. Meanwhile, reference signs 115 and 118 denote CPUs that control various driving operations of the camera device 102 and the lens apparatus 101.

Figure 22:
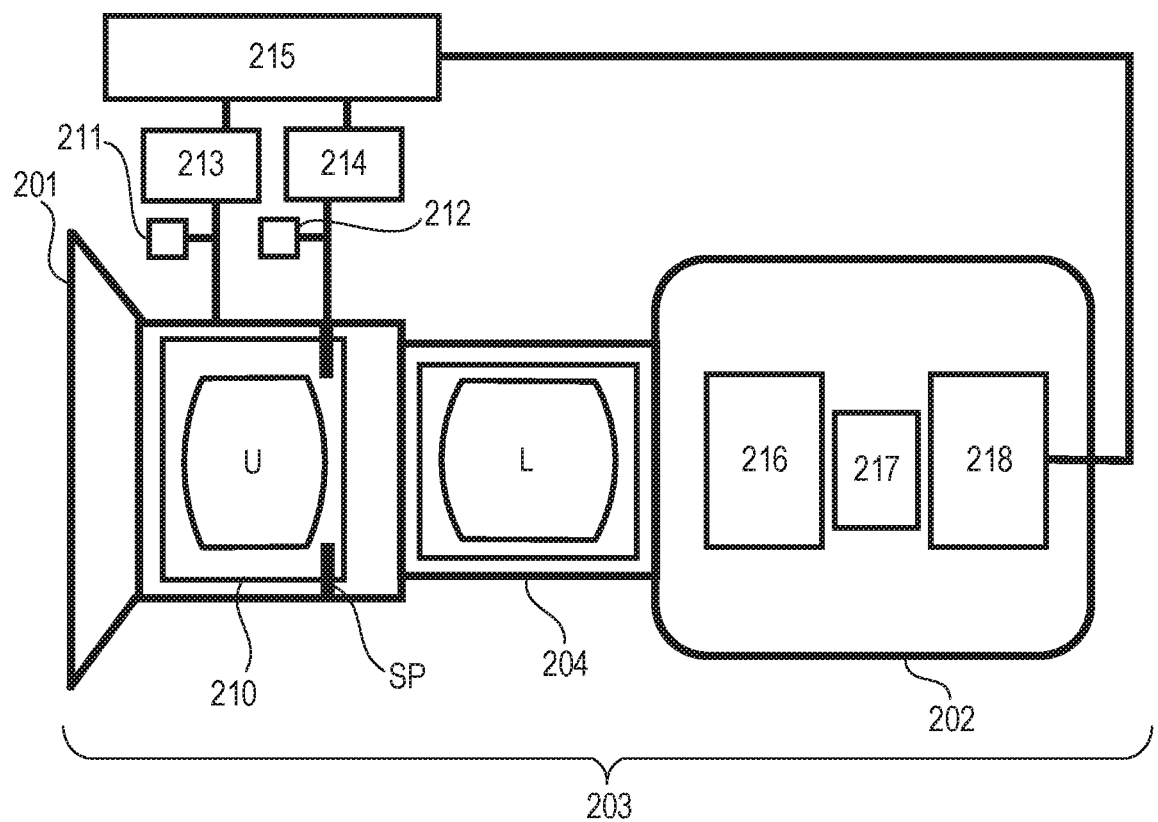
FIG. 22 is a schematic diagram of a substantial part of an image pickup apparatus equipped with an adapter including the spherical aberration-variable optical system of the disclosure.

FIG. 22 is a schematic diagram of an image pickup apparatus (a television camera system) constructed as a spherical aberration-variable adapter apparatus which allows attachment and detachment of the spherical aberration-variable optical system of any of the embodiments to and from the image side of the image pickup optical system. In FIG. 22, reference sign 201 denotes a lens apparatus of any one of the first to ninth embodiments. Reference sign 204 denotes an adapter apparatus which is the spherical aberration-variable optical system of any one of the first to ninth embodiments. Reference sign 202 denotes a camera device. The adapter apparatus 204 is attachable to and detachable from the lens apparatus 201 and the camera device 202 by using attachment members formed on the image side and the object side of the adapter apparatus 204. Reference sign 203 denotes an image pickup apparatus which is formed by attaching the adapter apparatus 204 and the lens apparatus 201 to the camera device 202. The lens apparatus 201 includes the image pickup optical system U while the adapter apparatus 204 includes the spherical aberration-variable optical system L. The image pickup optical system U includes a focusing lens unit. Reference sign SP denotes the aperture stop. Reference sign 210 denotes a driving mechanism such as a helicoid and a cam, which drives the focusing lens unit in the image pickup optical system U in the direction of the optical axis. Reference signs 213 and 214 denote motors (driving units) that electrically drive the driving mechanism 210 and the aperture stop SP. Reference signs 211 and 212 denote detectors such as encoders, potentiometers, and photosensors for detecting a position of the image pickup optical system U on the optical axis and an aperture size of the aperture stop SP. In the camera device 202, reference sign 216 denotes a glass block that corresponds to an optical filter and a color separation optical system in the camera device 202, and reference sign 217 denotes a solid-state image pickup element (a photoelectric conversion element) such as a CCD sensor and a CMOS sensor to receive an object image formed by the lens apparatus 201. Meanwhile, reference signs 215 and 218 denote CPUs that control various driving operations of the camera device 202 and the lens apparatus 201.

Numerical Embodiment 1

[Unit mm]

Surface data

| Surface number | r | d | nd | vd | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12(stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 3.33 | | | 37.18 |
| 20 | 90.313 | 2.54 | 1.84666 | 23.8 | 40.90 |
| 21 | 114.916 | (Variable) | | | 40.55 |
| 22 | −2328.457 | 1.50 | 1.77250 | 49.6 | 40.49 |
| 23 | 74.461 | 7.03 | 1.48749 | 70.2 | 40.48 |
| 24 | −94.128 | (Variable) | | | 40.69 |
| 25 | −111.186 | 1.50 | 1.88300 | 40.8 | 40.36 |
| 26 | −438.335 | (Variable) | | | 40.76 |
| image plane | ∞ | | | | |

Aspheric surface data

15th surface

K = 4.82454e+000
A4 = 1.27386e−005
A6 = 2.46580e−009
A8 = −1.63965e−011
A10 = 1.16481e−014

| | normal | under | over |
|---|---|---|---|
| Focal length | 34.19 | 34.07 | 34.30 |
| F-NUMBER | 1.45 | 1.44 | 1.45 |
| Half angle of view | 32.33 | 32.42 | 32.25 |
| Image height | 21.64 | 21.64 | 21.64 |
| Total lens length | 132.38 | 132.37 | 132.37 |
| BF | 13.32 | 13.31 | 13.31 |
| d21 | 8.92 | 5.82 | 11.74 |
| d24 | 4.44 | 7.54 | 1.62 |
| d26 | 13.32 | 13.31 | 13.31 |
| Entrance pupil position | 35.84 | 35.84 | 35.84 |
| Exit pupil position | −57.98 | −57.66 | −58.27 |
| Front principal point position | 53.63 | 53.55 | 53.70 |
| Rear principal point position | −20.87 | −20.76 | −20.99 |

Lens unit data

| Unit | Start surface | Focal length | Lens structure length | Front principal point position | Rear principal point position |
|---|---|---|---|---|---|
| U | 1 | 34.20 | 89.80 | 56.64 | 5.15 |
| L1 | 20 | 475.72 | 2.54 | −4.82 | −6.13 |
| L2 | 22 | 891.37 | 8.53 | 22.91 | 17.78 |
| L3 | 25 | −169.08 | 1.50 | −0.27 | −1.07 |

Numerical Embodiment 2

[Unit mm]

Surface data

| Surface number | r | d | nd | vd | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12(stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 4.33 | | | 37.18 |
| 20 | 98.176 | 2.63 | 1.84666 | 23.8 | 40.95 |
| 21 | 135.987 | (Variable) | | | 40.64 |
| 22 | 761.043 | 2.00 | 1.75500 | 52.3 | 40.58 |
| 23 | 120.959 | 2.12 | | | 40.43 |
| 24 | 362.842 | 4.65 | 1.49700 | 81.5 | 40.62 |
| 25 | −101.142 | (Variable) | | | 40.79 |
| 26 | −110.857 | 2.00 | 1.90366 | 31.3 | 40.37 |
| 27 | −390.928 | (Variable) | | | 40.81 |
| image plane | ∞ | | | | |

Aspheric surface data

15th surface

K = 4.82454e+000
A4 = 1.27386e−005
A6 = 2.46580e−009
A8 = −1.63965e−011
A10 = 1.16481e−014

| | normal | under | over |
|---|---|---|---|
| Focal length | 34.19 | 34.10 | 34.28 |
| F-NUMBER | 1.45 | 1.45 | 1.45 |
| Half angle of view | 32.33 | 32.40 | 32.26 |
| Image height | 21.64 | 21.64 | 21.64 |
| Total lens length | 132.33 | 132.32 | 132.32 |
| BF | 14.88 | 14.87 | 14.87 |
| d21 | 5.47 | 3.26 | 7.92 |
| d25 | 4.45 | 6.66 | 2.00 |
| d27 | 14.88 | 14.87 | 14.87 |
| Entrance pupil position | 35.84 | 35.84 | 35.84 |
| Exit pupil position | −58.91 | −58.67 | −59.19 |
| Front principal point position | 54.19 | 54.13 | 54.25 |
| Rear principal point position | −19.31 | −19.23 | −19.41 |

Lens unit data

| Unit | Start surface | Focal length | Lens structure length | Front principal point position | Rear principal point position |
|---|---|---|---|---|---|
| U | 1 | 34.20 | 89.80 | 56.64 | 5.15 |
| L1 | 20 | 404.14 | 2.63 | −3.58 | −4.96 |
| L2 | 22 | 860.17 | 8.77 | 24.74 | 18.90 |
| L3 | 26 | −171.81 | 2.00 | −0.42 | −1.47 |

Numerical Embodiment 3

[Unit mm]

Surface data

| Surface number | r | d | nd | vd | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12(stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 4.00 | | | 37.18 |
| 20 | 104.090 | 2.73 | 1.85478 | 24.8 | 41.07 |
| 21 | 158.581 | (Variable) | | | 40.79 |
| 22 | −106.217 | 2.44 | 1.90366 | 31.3 | 40.62 |
| 23 | −88.417 | (Variable) | | | 40.94 |
| 24 | −127.815 | 2.00 | 1.89190 | 37.1 | 39.94 |
| 25 | 51.540 | 7.45 | 1.65160 | 58.5 | 40.56 |
| 26 | −163.279 | (Variable) | | | 41.01 |
| image plane | ∞ | | | | |

Aspheric surface data

15th surface

K = 4.82454e+000
A4 = 1.27386e−005
A6 = 2.46580e−009
A8 = −1.63965e−011
A10 = 1.16481e−014

| | normal | under | over |
|---|---|---|---|
| Focal length | 34.19 | 33.99 | 34.46 |
| F-NUMBER | 1.45 | 1.44 | 1.46 |
| Half angle of view | 32.32 | 32.47 | 32.12 |
| Image height | 21.64 | 21.64 | 21.64 |
| Total lens length | 133.52 | 133.35 | 133.72 |
| BF | 10.32 | 10.15 | 10.52 |
| d21 | 9.57 | 6.93 | 13.28 |
| d23 | 5.21 | 7.85 | 1.50 |
| d26 | 10.32 | 10.15 | 10.52 |
| Entrance pupil position | 35.84 | 35.84 | 35.84 |
| Exit pupil position | −61.30 | −60.96 | −61.80 |
| Front principal point position | 53.71 | 53.58 | 53.88 |
| Rear principal point position | −23.87 | −23.85 | −23.95 |

Lens unit data

| Unit | Start surface | Focal length | Lens structure length | Front principal point position | Rear principal point position |
|---|---|---|---|---|---|
| U | 1 | 34.20 | 89.80 | 56.64 | 5.15 |
| L1 | 20 | 346.40 | 2.73 | −2.75 | −4.19 |
| L2 | 22 | 548.18 | 2.44 | 7.18 | 5.98 |
| L3 | 24 | −134.32 | 9.45 | −2.33 | −8.06 |

Numerical Embodiment 4

[Unit mm]

Surface data

| Surface number | r | d | nd | vd | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12(stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 4.33 | | | 37.18 |
| 20 | 103.163 | 3.10 | 1.84666 | 23.8 | 40.93 |
| 21 | 217.442 | 2.00 | 1.62041 | 60.3 | 40.64 |
| 22 | 119.842 | (Variable) | | | 40.25 |
| 23 | 2574.050 | 2.00 | 1.88300 | 40.8 | 40.22 |
| 24 | 88.560 | 6.33 | 1.49700 | 81.5 | 40.15 |
| 25 | −101.599 | (Variable) | | | 40.35 |
| 26 | −115.563 | 2.00 | 1.90366 | 31.3 | 40.05 |
| 27 | −642.033 | (Variable) | | | 40.53 |
| image plane | ∞ | | | | |

Aspheric surface data

15th surface

K = 4.82454e+000
A4 = 1.27386e−005
A6 = 2.46580e−009
A8 = −1.63965e−011
A10 = 1.16481e−014

| | normal | under | over |
|---|---|---|---|
| Focal length | 34.19 | 34.10 | 34.28 |
| F-NUMBER | 1.45 | 1.45 | 1.45 |
| Half angle of view | 32.33 | 32.39 | 32.26 |
| Image height | 21.64 | 21.64 | 21.64 |
| Total lens length | 133.46 | 133.45 | 133.45 |
| BF | 12.95 | 12.94 | 12.94 |
| d22 | 6.11 | 3.62 | 8.95 |
| d25 | 4.84 | 7.33 | 2.00 |
| d27 | 12.95 | 12.94 | 12.94 |
| Entrance pupil position | 35.84 | 35.84 | 35.84 |
| Exit pupil position | −55.63 | −55.43 | −55.87 |
| Front principal point position | 52.98 | 52.93 | 53.04 |
| Rear principal point position | −21.24 | −21.16 | −21.34 |

Lens unit data

| Unit | Start surface | Focal length | Lens structure length | Front principal point position | Rear principal point position |
|---|---|---|---|---|---|
| U | 1 | 34.20 | 89.80 | 56.64 | 5.15 |
| L1 | 20 | 471.43 | 5.10 | −7.94 | −10.67 |
| L2 | 23 | 1042.71 | 8.33 | 22.26 | 17.32 |
| L3 | 26 | −156.24 | 2.00 | −0.23 | −1.28 |

Numerical Embodiment 5

[Unit mm]

Surface data

| Surface number | r | d | nd | vd | Effective diameter |
|---|---|---|---|---|---|
| 1 | 61.880 | 2.99 | 1.83481 | 42.7 | 54.06 |
| 2 | 27.026 | 8.34 | | | 43.43 |
| 3 | 71.747 | 3.00 | 1.58313 | 59.4 | 43.00 |
| 4* | 25.706 | 6.93 | | | 38.65 |
| 5 | 92.706 | 4.95 | 1.88300 | 40.8 | 38.41 |
| 6 | −127.713 | 0.70 | | | 37.98 |
| 7 | −97.467 | 2.50 | 1.49700 | 81.5 | 37.74 |
| 8 | 39.023 | 5.83 | 1.83481 | 42.7 | 34.40 |
| 9 | −1070.546 | 3.79 | | | 33.55 |
| 10 | 46.333 | 5.98 | 1.83481 | 42.7 | 27.33 |
| 11 | −47.248 | 1.90 | 1.54814 | 45.8 | 25.68 |
| 12 | 21.482 | 5.07 | | | 23.10 |
| 13 | −53.687 | 1.40 | 1.65412 | 39.7 | 23.14 |
| 14 | 197.561 | 0.15 | | | 23.87 |
| 15 | 29.239 | 6.73 | 1.43387 | 95.1 | 25.16 |
| 16 | −44.333 | 2.59 | | | 25.21 |
| 17(stop) | ∞ | 7.21 | | | 24.21 |
| 18 | −17.904 | 3.78 | 1.60311 | 60.6 | 23.57 |
| 19 | −15.383 | 2.15 | 1.80518 | 25.4 | 24.58 |
| 20 | −48.206 | 0.25 | | | 28.73 |
| 21 | 97.922 | 8.54 | 1.61800 | 63.3 | 31.70 |
| 22 | −29.308 | 0.25 | | | 33.26 |
| 23* | −162.434 | 5.28 | 1.80400 | 46.6 | 34.68 |
| 24 | −36.488 | 2.77 | | | 36.15 |
| 25 | 90.313 | 2.54 | 1.84666 | 23.8 | 40.90 |
| 26 | 114.916 | (Variable) | | | 40.55 |
| 27 | −2328.457 | 1.50 | 1.77250 | 49.6 | 40.49 |
| 28 | 74.461 | 7.03 | 1.48749 | 70.2 | 40.48 |
| 29 | −94.128 | (Variable) | | | 40.69 |
| 30 | −111.186 | 1.50 | 1.88300 | 40.8 | 40.36 |
| 31 | −438.335 | (Variable) | | | 40.76 |
| image plane | ∞ | | | | |

Aspheric surface data

4th surface

K = 0.00000e+000
A4 = −5.57660e−006
A6 = −9.40593e−009
A8 = 5.84881e−012
A10 = −3.17028e−014

23th surface

K = 0.00000e+000
A4 = −1.09975e−005
A6 = −1.48146e−009
A8 = −9.36205e−012
A10 = −5.31145e−015

| | normal | under | over |
|---|---|---|---|
| Focal length | 24.54 | 24.46 | 24.62 |
| F-NUMBER | 1.45 | 1.44 | 1.45 |
| Half angle of view | 41.40 | 41.50 | 41.31 |
| Image height | 21.64 | 21.64 | 21.64 |
| Total lens length | 132.33 | 132.32 | 132.32 |
| BF | 13.33 | 13.32 | 13.31 |
| d26 | 8.92 | 5.82 | 11.74 |
| d29 | 4.44 | 7.54 | 1.62 |
| d31 | 13.33 | 13.32 | 13.31 |
| Entrance pupil position | 29.97 | 29.97 | 29.97 |
| Exit pupil position | −63.02 | −62.70 | −63.33 |
| Front principal point position | 46.63 | 46.56 | 46.68 |
| Rear principal point position | −11.22 | −11.14 | −11.31 |

-continued

[Unit mm]

Lens unit data

| Unit | Start surface | Focal length | Lens structure length | Front principal point position | Rear principal point position |
|---|---|---|---|---|---|
| U | 1 | 24.55 | 90.31 | 48.18 | 14.25 |
| L1 | 25 | 475.72 | 2.54 | −4.82 | −6.13 |
| L2 | 27 | 891.37 | 8.53 | 22.91 | 17.78 |
| L3 | 30 | −169.08 | 1.50 | −0.27 | −1.07 |

Numerical Embodiment 6

[Unit mm]

Surface data

| Surface number | r | d | nd | vd | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12(stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 3.36 | | | 37.18 |
| 20 | 1920.251 | 2.49 | 1.91650 | 31.6 | 39.74 |
| 21 | −505.053 | (Variable) | | | 39.76 |
| 22 | −260.947 | 1.50 | 1.75500 | 52.3 | 39.66 |
| 23 | 121.089 | 4.95 | 1.56732 | 42.8 | 39.79 |
| 24 | −111.258 | (Variable) | | | 39.91 |
| 25 | −102.687 | 1.50 | 1.88300 | 40.8 | 39.30 |
| 26 | −469.153 | (Variable) | | | 39.71 |
| image plane | ∞ | | | | |

Aspheric surface data

15th surface

K = 4.82454e+000
A4 = 1.27386e−005
A6 = 2.46580e−009
A8 = −1.63965e−011
A10 = 1.16481e−014

| | normal | under | over |
|---|---|---|---|
| Focal length | 35.91 | 35.82 | 36.00 |
| F-NUMBER | 1.52 | 1.52 | 1.53 |
| Half angle of view | 31.07 | 31.13 | 31.01 |
| Image height | 21.64 | 21.64 | 21.64 |
| Total lens length | 133.70 | 133.68 | 133.69 |
| BF | 19.05 | 19.03 | 19.04 |
| d21 | 5.48 | 2.36 | 8.96 |
| d24 | 5.57 | 8.69 | 2.09 |
| d26 | 19.05 | 19.03 | 19.04 |
| Entrance pupil position | 35.84 | 35.84 | 35.84 |
| Exit pupil position | −53.38 | −53.19 | −53.61 |
| Front principal point position | 53.94 | 53.89 | 54.00 |
| Rear principal point position | −16.86 | −16.79 | −16.96 |

-continued

[Unit mm]

Lens unit data

| Unit | Start surface | Focal length | Lens structure length | Front principal point position | Rear principal point position |
|---|---|---|---|---|---|
| U | 1 | 34.20 | 89.80 | 56.64 | 5.15 |
| L1 | 20 | 436.53 | 2.49 | 1.03 | −0.27 |
| L2 | 22 | 1358.06 | 6.45 | 26.02 | 22.43 |
| L3 | 25 | −149.17 | 1.50 | −0.22 | −1.02 |

Numerical Embodiment 7

[Unit mm]

Surface data

| Surface number | r | d | nd | vd | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12(stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 4.31 | | | 37.18 |
| 20 | 63.557 | 2.58 | 1.95906 | 17.5 | 41.51 |
| 21 | 73.649 | (Variable) | | | 40.93 |
| 22 | 183.292 | 2.00 | 2.00330 | 28.3 | 40.89 |
| 23 | 90.289 | 3.30 | | | 40.50 |
| 24 | 215.838 | 5.00 | 1.48749 | 70.2 | 40.94 |
| 25 | −105.290 | (Variable) | | | 41.11 |
| 26 | −103.281 | 2.00 | 2.00330 | 28.3 | 40.71 |
| 27 | −247.791 | (Variable) | | | 41.23 |
| image plane | ∞ | | | | |

Aspheric surface data

15th surface

K = 4.82454e+000
A4 = 1.27386e−005
A6 = 2.46580e−009
A8 = −1.63965e−011
A10 = 1.16481e−014

| | normal | under | over |
|---|---|---|---|
| Focal length | 33.52 | 33.33 | 33.56 |
| F-NUMBER | 1.42 | 1.41 | 1.42 |
| Half angle of view | 32.84 | 32.99 | 32.81 |
| Image height | 21.64 | 21.64 | 21.64 |
| Total lens length | 131.90 | 131.81 | 131.80 |
| BF | 12.01 | 11.32 | 11.31 |
| d21 | 6.10 | 4.59 | 9.49 |
| d25 | 4.80 | 6.90 | 2.00 |
| d27 | 12.01 | 11.32 | 11.31 |
| Entrance pupil position | 35.84 | 35.84 | 35.84 |

-continued

[Unit mm]

| | | | |
|---|---|---|---|
| Exit pupil position | −61.01 | −61.07 | −61.76 |
| Front principal point position | 53.97 | 53.82 | 53.98 |
| Rear principal point position | −21.51 | −22.01 | −22.25 |

Lens unit data

| Unit | Start surface | Focal length | Lens structure length | Front principal point position | Rear principal point position |
|---|---|---|---|---|---|
| U | 1 | 34.20 | 89.80 | 56.64 | 5.15 |
| L1 | 20 | 429.84 | 2.58 | −7.37 | −8.54 |
| L2 | 22 | 688.93 | 10.30 | 23.68 | 16.55 |
| L3 | 26 | −177.74 | 2.00 | −0.72 | −1.72 |

Numerical Embodiment 8

[Unit mm]

Surface data

| Surface number | r | d | nd | vd | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12(stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 3.32 | | | 37.18 |
| 20 | 80.780 | 2.59 | 1.84666 | 23.8 | 41.09 |
| 21 | 101.174 | (Variable) | | | 40.69 |
| 22 | −2297.183 | 1.50 | 1.71300 | 53.9 | 40.51 |
| 23 | 55.982 | 7.13 | 1.48749 | 70.2 | 40.48 |
| 24 | −112.968 | (Variable) | | | 40.64 |
| 25 | −147.109 | 1.50 | 1.90366 | 31.3 | 40.61 |
| 26 | −610.052 | (Variable) | | | 40.93 |
| image plane | ∞ | | | | |

Aspheric surface data

15th surface

K = 4.82454e+000
A4 = 1.27386e−005
A6 = 2.46580e−009
A8 = −1.63965e−011
A10 = 1.16481e−014

| | normal | under | over |
|---|---|---|---|
| Focal length | 33.98 | 33.99 | 33.95 |
| F-NUMBER | 1.44 | 1.44 | 1.44 |
| Half angle of view | 32.49 | 32.48 | 32.50 |
| Image height | 21.64 | 21.64 | 21.64 |
| Total lens length | 132.28 | 132.43 | 132.07 |
| BF | 12.72 | 12.87 | 12.51 |
| d21 | 7.55 | 4.16 | 12.16 |

-continued

[Unit mm]

| | | | |
|---|---|---|---|
| d24 | 6.17 | 9.56 | 1.56 |
| d26 | 12.72 | 12.87 | 12.51 |
| Entrance pupil position | 35.84 | 35.84 | 35.84 |
| Exit pupil position | −59.47 | −59.38 | −59.60 |
| Front principal point position | 53.82 | 53.84 | 53.80 |
| Rear principal point position | −21.26 | −21.12 | −21.45 |

Lens unit data

| Unit | Start surface | Focal length | Lens structure length | Front principal point position | Rear principal point position |
|---|---|---|---|---|---|
| U | 1 | 34.20 | 89.80 | 56.64 | 5.15 |
| L1 | 20 | 447.28 | 2.59 | −5.25 | −6.58 |
| L2 | 22 | 15008.87 | 8.63 | 315.32 | 316.28 |
| L3 | 25 | −214.85 | 1.50 | −0.25 | −1.04 |

Numerical Embodiment 9

[Unit mm]

Surface data

| Surface number | r | d | nd | vd | Effective diameter |
|---|---|---|---|---|---|
| 1 | 320.116 | 2.80 | 1.51633 | 64.1 | 51.99 |
| 2 | 41.977 | 5.78 | | | 45.00 |
| 3 | 174.176 | 2.30 | 1.51823 | 58.9 | 44.56 |
| 4 | 39.095 | 14.53 | | | 41.15 |
| 5 | 83.274 | 4.44 | 1.77250 | 49.6 | 39.37 |
| 6 | −395.333 | 6.26 | | | 38.88 |
| 7 | 57.067 | 5.14 | 1.77250 | 49.6 | 35.63 |
| 8 | −200.681 | 8.71 | | | 35.34 |
| 9 | 607.365 | 6.47 | 1.77250 | 49.6 | 30.62 |
| 10 | −28.883 | 1.50 | 1.65412 | 39.7 | 30.02 |
| 11 | 57.419 | 4.23 | | | 26.96 |
| 12(stop) | ∞ | 7.82 | | | 25.98 |
| 13 | −19.812 | 1.60 | 1.80518 | 25.4 | 24.65 |
| 14 | 162.417 | 4.90 | 1.83481 | 42.7 | 27.82 |
| 15* | −75.797 | 0.20 | | | 29.43 |
| 16 | −470.465 | 6.60 | 1.77250 | 49.6 | 30.27 |
| 17 | −32.806 | 0.20 | | | 32.76 |
| 18 | −154.187 | 6.32 | 1.77250 | 49.6 | 35.98 |
| 19 | −34.950 | 3.30 | | | 37.18 |
| 20 | 47.718 | 3.77 | 1.84666 | 23.8 | 42.37 |
| 21 | 50.234 | (Variable) | | | 41.13 |
| 22 | 213.116 | 1.50 | 1.75500 | 52.3 | 41.19 |
| 23 | 42.705 | 9.86 | 1.49700 | 81.5 | 40.81 |
| 24 | −106.144 | (Variable) | | | 41.11 |
| 25 | −93.006 | 1.50 | 1.65160 | 58.5 | 40.92 |
| 26 | −311.395 | (Variable) | | | 41.40 |
| image plane | ∞ | | | | |

Aspheric surface data

15th surface

K = 4.82454e+000
A4 = 1.27386e−005
A6 = 2.46580e−009
A8 = −1.63965e−011
A10 = 1.16481e−014

| | normal | under | over |
|---|---|---|---|
| Focal length | 32.49 | 32.31 | 32.67 |
| F-NUMBER | 1.38 | 1.37 | 1.38 |
| Half angle of view | 33.66 | 33.81 | 33.52 |
| Image height | 21.64 | 21.64 | 21.64 |
| Total lens length | 131.98 | 131.86 | 132.07 |
| BF | 10.02 | 9.90 | 10.11 |
| d21 | 7.71 | 5.41 | 9.96 |
| d24 | 4.52 | 6.82 | 2.27 |
| d26 | 10.02 | 9.90 | 10.11 |
| Entrance pupil position | 35.84 | 35.84 | 35.84 |
| Exit pupil position | −62.77 | −62.28 | −63.27 |
| Front principal point position | 53.83 | 53.68 | 53.96 |
| Rear principal point position | −22.47 | −22.41 | −22.56 |

Lens unit data

| Unit | Start surface | Focal length | Lens structure length | Front principal point position | Rear principal point position |
|---|---|---|---|---|---|
| U | 1 | 34.20 | 89.80 | 56.64 | 5.15 |
| L1 | 20 | 667.02 | 3.77 | −22.95 | −24.16 |
| L2 | 22 | 441.68 | 11.36 | 13.18 | 5.88 |
| L3 | 25 | −204.07 | 1.50 | −0.39 | −1.30 |

TABLE 1

| Conditional expression | | Numerical embodiment | | | | | | | | |
|---|---|---|---|---|---|---|---|---|---|---|
| | | 1 | 2 | 3 | 4 | 5 | 6 | 7 | 8 | 9 |
| (1) | B | 1.00 | 1.00 | 1.00 | 1.00 | 1.00 | 1.05 | 0.98 | 0.99 | 0.95 |
| (2) | B2 | 1.00 | 1.00 | 0.98 | 1.00 | 1.00 | 1.00 | 1.00 | 1.02 | 0.98 |
| (4) | ndave | 1.83 | 1.83 | 1.90 | 1.80 | 1.83 | 1.82 | 2.00 | 1.81 | 1.70 |
| (5) | vd1 | 223.78 | 24.80 | 23.78 | 23.78 | 23.78 | 31.60 | 17.47 | 23.78 | 23.78 |
| (6) | f1/f3 | −2.81 | −2.35 | −2.58 | −3.02 | −2.81 | −2.93 | −2.42 | −2.08 | −3.27 |
| | f1 | 475.72 | 404.14 | 346.40 | 471.43 | 475.72 | 436.53 | 429.84 | 447.28 | 667.02 |
| | f3 | −169.08 | −171.81 | −134.32 | −156.24 | −169.08 | −149.17 | −177.74 | −214.85 | −204.07 |

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-101245, filed May 28, 2018, which is hereby incorporated by reference herein in its entirety.

What is claimed is:

1. A lens system to be disposed on an image side of an image pickup optical system and having a negative refractive power, the lens system comprising, in order from an object side to the image side, a first lens unit having a positive refractive power, a second lens unit, and a third lens unit,
   wherein the first lens unit consists of a single lens or a cemented lens,
   wherein the second lens unit is configured to move in a direction of an optical axis to change a spherical aberration, and
   wherein conditional expressions $0.90<B<1.10$, and $0.95<B2<1.05$ are satisfied where B is a lateral magnification of the lens system in a case where an axial ray is incident on the image pickup optical system and B2 is a lateral magnification of the second lens unit in a case where an axial ray is incident on the image pickup optical system.

2. The lens system according to claim 1,
   wherein a surface, of the second lens unit, located closest to the image side is convex toward the image side, and
   wherein a surface, of the third lens unit, located closest to the object side is concave toward the object side.

3. The lens system according to claim 1, wherein a conditional expression $1.65<ndave$ is satisfied where ndave is an average refractive index of negative lenses included in the lens system.

4. The lens system according to claim 1, wherein a conditional expression $15<vd1<40$ is satisfied where vd1 is an Abbe number with respect to the d-line of a lens located closest to the object side in the first lens unit.

5. The lens system according to claim 1, wherein a conditional expression $-5.0<f1/f3<-1.0$ is satisfied where f1 is a focal length of the first lens unit and f3 is a focal length of the third lens unit.

6. The lens system according to claim 1, wherein the third lens unit consists of a single lens or a cemented lens.

7. The lens system according to claim 1, wherein the lens system consists of four lenses.

8. The lens system according to claim 1, wherein the second lens unit consists of two lenses.

9. A lens apparatus comprising:
   an image pickup optical system; and
   a lens system disposed on an image side of the image pickup optical system,
   wherein the lens system has a negative refractive power, the lens system comprising, in order from an object side to the image side, a first lens unit having a positive refractive power, a second lens unit, and a third lens unit,
   wherein the first lens unit consists of a single lens or a cemented lens,
   wherein the second lens unit is configured to move in a direction of an optical axis to change a spherical aberration, and
   wherein conditional expressions $0.90<B<1.10$, and $0.95<B2<1.05$ are satisfied where B is a lateral magnification of the lens system in a case where an axial ray is incident on the image pickup optical system and B2 is a lateral magnification of the second lens unit in a case where an axial ray is incident on the image pickup optical system.

10. The lens apparatus according to claim 9,
    wherein a surface, of the second lens unit, located closest to the image side is convex toward the image side, and
    wherein a surface, of the third lens unit, located closest to the object side is concave toward the object side.

11. The lens apparatus according to claim 9, wherein a conditional expression $1.65<ndave$ is satisfied where ndave is an average refractive index of negative lenses included in the lens system.

12. The lens apparatus according to claim 9, wherein a conditional expression $15<vd1<40$ is satisfied where vd1 is an Abbe number with respect to the d-line of a lens located closest to the object side in the first lens unit.

13. The lens apparatus according to claim 9, wherein a conditional expression $-5.0<f1/f3<-1.0$ is satisfied where f1 is a focal length of the first lens unit and f3 is a focal length of the third lens unit.

14. An image pickup apparatus comprising:
    a lens apparatus; and
    an image pickup element disposed on an image plane of the lens apparatus,
    wherein the lens apparatus comprises:
    an image pickup optical system; and
    a lens system disposed on an image side of the image pickup optical system,
    wherein the lens system has a negative refractive power, the lens system comprising, in order from an object side to the image side, a first lens unit having a positive refractive power, a second lens unit, and a third lens unit,
    wherein the first lens unit consists of a single lens or a cemented lens,
    wherein the second lens unit is configured to move in a direction of an optical axis to change a spherical aberration, and
    wherein conditional expressions $0.90<B<1.10$, and $0.95<B2<1.05$ are satisfied where B is a lateral magnification of the lens system in a case where an axial ray is incident on the image pickup optical system and B2 is a lateral magnification of the second lens unit in a case where an axial ray is incident on the image pickup optical system.

15. The image pickup apparatus according to claim 14, wherein a surface, of the second lens unit, located closest to the image side is convex toward the image side, and wherein a surface, of the third lens unit, located closest to the object side is concave toward the object side.

16. The image pickup apparatus according to claim 14, wherein a conditional expression $$1.65 < ndave$$

is satisfied where ndave is an average refractive index of negative lenses included in the lens system.

17. The image pickup apparatus according to claim 14, wherein a conditional expression $$15 < vd1 < 40$$

is satisfied where vd1 is an Abbe number with respect to the d-line of a lens located closest to the object side in the first lens unit.

18. The image pickup apparatus according to claim 14, wherein a conditional expression $$-5.0 < f1/f3 < -1.0$$

is satisfied where f1 is a focal length of the first lens unit and f3 is a focal length of the third lens unit.

19. An adapter apparatus comprising:
a lens system; and
a mounting member configured to mount an image pickup optical system in an object side of the lens system,
wherein the lens system has a negative refractive power, the lens system comprising, in order from an object side to the image side, a first lens unit having a positive refractive power, a second lens unit, and a third lens unit,
wherein the first lens unit consists of a single lens or a cemented lens,
wherein the second lens unit is configured to move in a direction of an optical axis to change a spherical aberration, and
wherein conditional expressions $$0.90 < B < 1.10, \text{ and}$$

$$0.95 < B2 < 1.05$$

are satisfied where B is a lateral magnification of the lens system in a case where an axial ray is incident on the image pickup optical system and B2 is a lateral magnification of the second lens unit in a case where an axial ray is incident on the image pickup optical system.

20. The adapter apparatus according to claim 19, further comprising:
a mounting member configured to mount an image pickup element in an image side of the lens system.

* * * * *